(12) United States Patent
Sakuma et al.

(10) Patent No.: US 6,815,859 B2
(45) Date of Patent: Nov. 9, 2004

(54) SYNCHRONOUS RELUCTANCE MOTOR

(75) Inventors: Masafumi Sakuma, Aichi-ken (JP); Tomohiro Fukushima, Aichi-ken (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 10/091,528

(22) Filed: Mar. 7, 2002

(65) Prior Publication Data

US 2003/0094875 A1 May 22, 2003

(30) Foreign Application Priority Data

Mar. 7, 2001 (JP) .......................................... 2001-064004
Mar. 23, 2001 (JP) .......................................... 2001-084271

(51) Int. Cl.[7] ................................................. H02K 1/27
(52) U.S. Cl. ................... 310/156.53; 310/162; 310/254; 310/261
(58) Field of Search ................................ 310/261, 254, 310/156.38, 156.41, 156.48, 156.53, 156.56, 156.55, 156.57, 162

(56) References Cited

U.S. PATENT DOCUMENTS

| | | | | |
|---|---|---|---|---|
| 4,924,130 A | * | 5/1990 | Fratta | 310/261 |
| 5,945,760 A | * | 8/1999 | Honda et al. | 310/156.53 |
| 6,049,153 A | * | 4/2000 | Nishiyama et al. | 310/156.53 |
| 6,239,526 B1 | * | 5/2001 | Oh et al. | 310/162 |

* cited by examiner

*Primary Examiner*—Burton Mullins
(74) *Attorney, Agent, or Firm*—Sughrue Mion, PLLC

(57) ABSTRACT

In a synchronous reluctance motor having a rotor having a plurality of pairs of an outer side slot formed at an outer periphery side and an inner side slot formed at inner side of the rotor. The distance between the outer periphery of the rotor and the outer side slot is determined to be the width of the stator magnetic pole portion of the stator multiplied by 0.7 to 1.3. A first total magnetic flux amount of an outer side permanent magnet disposed in the outer side slot is determined to be larger than or equal to a second total magnetic flux amount of an inner side permanent magnet disposed in the inner side slot.

10 Claims, 17 Drawing Sheets ized to be large or wide. Because the inductance Lq
SYNCHRONOUS RELUCTANCE MOTOR This application is based on and claims priority under 35 U.S.C. §119 with respect to Japanese Patent Applications No. 2001-064004 filed on Mar. 7, 2001 and No. 2001-084271 filed on Mar. 23, 2001, the entire content of which is incorporated herein by reference.

FIELD OF THE INVENTION

This invention generally relates to a synchronous reluctance motor.

BACKGROUND OF THE INVENTION

A synchronous motor has a stator and a rotor supported in the inner periphery of the stator and is capable of being locally exciting, being structurally the same as the stator of a common induction motor. Generally, the synchronous reluctance motor is well known as a motor which is simply structured so as to not need electric current channels and permanent magnets in the rotor.

Presently, synchronous reluctance motors having a good power factor and efficiency by a structurally improved rotor are well known. In a Japanese Patent Application Laid-Open Publication No. 8(1996)-331783 published on Dec. 13, 1966, a permanent-magnetic motor additionally generating a reluctance torque by using a synchronous reluctance motor to generate a rotational torque is proposed. In other words, the above permanent-magnetic motor can be regarded as the synchronous reluctance motor generating the rotational torque by mainly permanent magnets. This synchronous reluctance motor (the disclosed permanent-magnetic motor) has a rotor having some pairs of slots that are formed approximately parallel to each other in the circumferential direction of the rotor. The slots are extended adjacent to the outer peripheral surface of the rotor, and the permanent magnets are secured in the pairs of slots.

The synchronous reluctance motor is designed with the aim of generating a larger torque and higher power by using reluctance torque. The reluctance torque is generated by a difference between the inductance Ld of the rotor in a d-axis direction (defined by connecting a center-point of the permanent magnet in circumferential direction of the rotor with a rotational center of the rotor), and an induction Lq of the rotor in a q-axis direction (defined as a direction rotated relative to the d-axis direction by 90 electrical degrees).

As described above, this synchronous reluctance motor is aimed to use the reluctance torque. But the synchronous reluctance motor is constructed to mainly use a magnet torque generated between the permanent magnet and the rotor, and not to positively and sufficiently use the reluctance torque.

In the rotor of this synchronous reluctance motor, portions of the rotor defined between the permanent magnets neighboring each other in the circumferential direction (or distance S defined between the permanent magnets neighboring each other in the circumferential direction) are determined to be as small or narrow as possible. To the contrary, the permanent magnets are designed to be as large in size as possible so that the magnetic flux will not leak outside of the distance S, and for efficiently using the magnet torque.

In this synchronous reluctance motor, the inductance Lq should be large, while, the inductance Ld should be small for generating the reluctance torque. Only for determining the inductances Ld and Lq as above, the distance S should be determined to be large or wide. Because the inductance Lq is increased due to the increased gap S, the inductance Ld is not so increased that the magnetic circuit connecting magnetic pole portions of the stator is formed in the rotor. If the reluctance torque is increased relative to the total torque generated by the synchronous reluctance motor, a torque ripple may occur. To reduce the torque ripple, a plurality of permanent magnets need to be disposed in the radial direction of the rotor, but then, for example, the manufacturing cost of the rotor will be increased.

Thus the synchronous reluctance motor capable of generating the large total torque and reducing the torque ripple, and further manufactured at low cost is desired.

SUMMARY OF THE INVENTION

The object of the present invention is to provide a synchronous reluctance motor capable of generating large total torque, reducing the torque ripple, and manufactured in low cost.

According to a first aspect of the present invention, a synchronous reluctance motor has a stator having a predetermined number of toothed stator magnetic pole portions wound by armature coils, and a rotor rotatably supported at an inner peripheral surface of the stator and having a pair of slots formed to be arranged in a radial direction and extending along the inner periphery of the stator with a predetermined interval. The synchronous reluctance further has the pair of slots including an outer side slot formed at an outer periphery side of the rotor and an inner side slot formed at inner side of the rotor. Both the outer side slot and the inner side slot extend toward the outer peripheral surface of the rotor to form a rotor magnetic pole portion. A width of an effective magnetic path between the outer periphery of the rotor and the outer side slot is defined based on the width of a stator magnetic pole portion multiplied by a predetermined number. The predetermined number is preferably determined to be between 0.7 and 1.3.

By determining the width of the effective magnetic path between the outer periphery of the rotor and the outer side slot, the high performance synchronous reluctance motor capable of generating the reluctance torque and reducing the torque ripple can be manufactured.

According to a twelfth aspect of the present invention, the synchronous reluctance motor has the stator having the predetermined number of toothed stator magnetic pole portions wound by armature coils, and the rotor rotatably supported at the inner peripheral surface of the stator side and having plurality of slots for the rotor magnetic pole portion arranged in the radial direction and extending along the inner periphery of the stator with the predetermined interval and extending toward the outer periphery of the rotor. The synchronous reluctance motor has the outer side permanent magnet and the inner side permanent magnet disposed in the plurality of slots. Each portion in the inner side permanent magnet and the outer side permanent magnet facing each other in the radial direction is magnetized to be different magnetic pole. The first total magnetic flux amount of the outer side permanent magnet is determined to be larger than or equal to the second total magnetic flux amount of the inner side permanent magnet when a center-line of both the outer side slot and the inner side slot in a circumferential direction of the rotor is located in another center-line of the stator magnetic pole portion in the circumferential direction of the stator, and when the armature coils winding around the stator magnetic pole portions are not electrically fed.

By determining the first total magnetic flux amount and the second total magnetic flux amount as described above, the synchronous reluctance motor capable of generating the reluctance torque and reducing the torque ripple can be manufactured.

BRIEF DESCRIPTION OF THE DRAWING

The foregoing and additional features and characteristics of the present invention will become more apparent from the following detailed description considered with reference to accompanying drawings in which like reference numerals designate like elements and wherein.

DETAILED DESCRIPTION OF THE INVENTION

Hereinafter, embodiments of the present invention will be described based on drawings as follows. The synchronous reluctance motors according to a first aspect of the present invention is schematically and structurally shown in FIG. 4. The synchronous reluctance motor of a first embodiment (hereinafter, called a synchronous reluctance motor 10D) is a high performance three-phase wie-connected motor driven by a general-use inverter mainly generating a reluctance torque.

Figure 4:
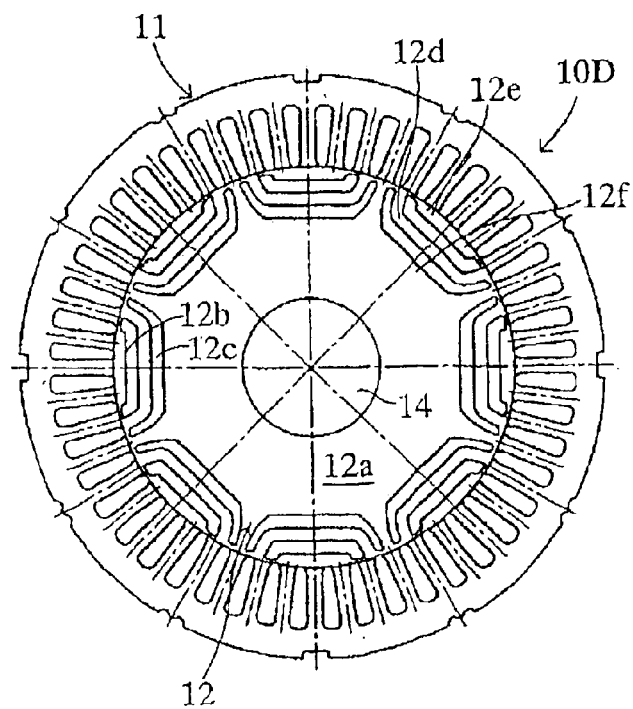
FIG. 4 shows a schematic drawing of the synchronous reluctance motor in accordance with a first aspect of the present invention.

The synchronous reluctance motor 10D has a stator 11 having 48 stator magnetic pole portions, and a rotor 12 having 8 rotor magnetic pole portions, as shown in FIG. 4. The stator 11 has a predetermined number of teeth 11a (48 teeth 11a in FIG. 4) arranged on an inner periphery of the rotor 11. Each tooth 11a is wound by armature coils (not shown in FIG. 4) to be the stator magnetic pole portion. The stator 11 supports the rotor 12 on its inner peripheral side.

The rotor 12 is mainly constructed by a rotor core 12a made of a high magnetic permeability material. The rotor 12 has plurality of pairs of slots formed in the rotor core 12a. The pairs of slots are arranged in a circumferential direction of the rotor 12. Each of the pair of slots is made of an outer side slot 12b and an inner side slot 12c neighboring each other in a radial direction of the rotor 12. Both the outer side slot 12b and the inner side slot 12c are formed to be curved such that center portions of both the outer side slot 12b and the inner side slot 12c in the circumferential direction are projected toward a rotational center of the rotor 12. The outer side slot 12b and the inner side slot 12c are formed with a predetermined interval therebetween, and extending toward the outer periphery of the rotor 12. Then, along the outer side slot 12b and the inner side slot 12c, eight sets of magnetic paths 12d, 12e and 12f for magnetic fluxes to pass through are formed in the rotor core 12a. As shown in FIG. 4, the magnetic paths 12d are formed between the outer side slots 12b and the inner side slots 12c, the magnetic paths 12e are formed between the outer slot 12b and the outer periphery of the rotor 12, and the magnetic paths 12f are formed along the inner side slots 12c at sides facing the rotational center of the rotor 12.

An inductance of the rotor 12 can be measured in a d-axis direction connecting a center-point of the permanent magnet in circumferential direction of the rotor 12 with the rotational center of the rotor 12. Another inductance of the rotor 12 can be measured in a q-axis direction defined as a direction rotated relative to the d-axis direction by an electrical degree 90 degree. In the above structured synchronous reluctance motor, the difference between the inductances of the rotor in the d-axis direction and the q-axis direction can be determined to be large. Thus, the synchronous reluctance motor is constructed to be able to generate a large reluctance torque because of the large inductance difference. A rotor 12 is fixed with a rotational shaft 14 for rotating therewith.

Figure 1:
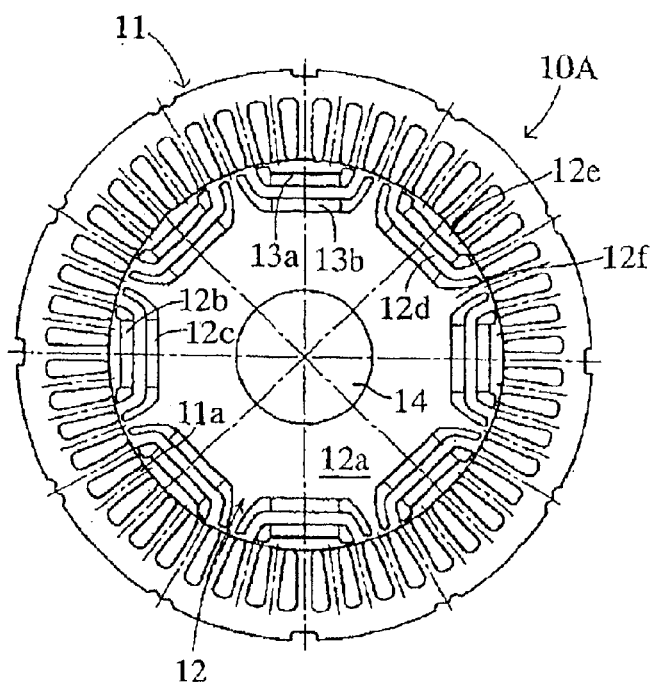
FIG. 1 shows a schematic drawing of a synchronous reluctance motor in accordance with a second aspect of the present invention.

A synchronous reluctance motor 10A according to a second aspect of the present invention is shown in FIG. 1. The synchronous reluctance motor 10A has a stator 11 and the rotor 12 is basically structurally as same as the synchronous reluctance motor 10D. Then, detailed descriptions about the structure of the rotor 12 are omitted. The synchronous reluctance motor 10A characteristically has eight pairs of outer side permanent magnets 13a and inner side permanent magnets 13b. The outer side permanent magnets 13a and the inner side permanent magnets 13b are embedded in the outer side slots 12b and the inner side slots 12c, respectively.

In the radial direction of the rotor 12, the portions facing each other of the permanent magnet 13a and the inner side permanent magnet 13b are magnetized to be different magnetic poles.

Figure 2:
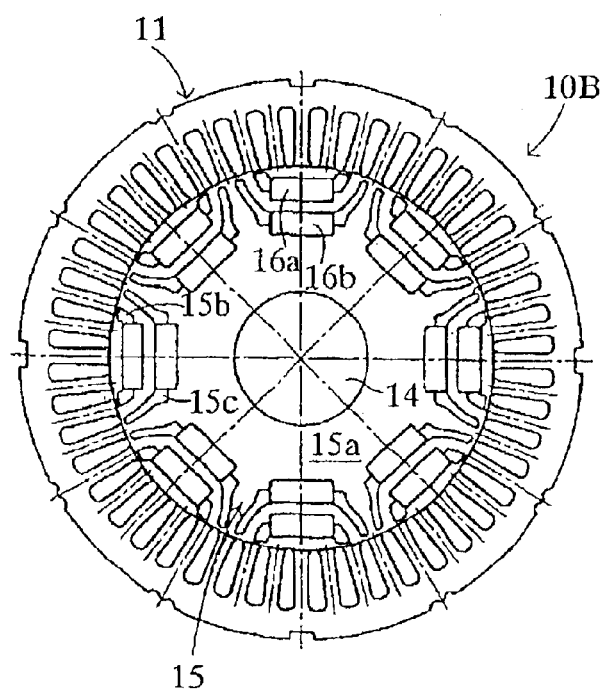
FIG. 2 shows a schematic drawing of another synchronous reluctance motor in accordance with a second aspect of the present invention.

A synchronous reluctance motor 10B, as partially structurally modified the synchronous reluctance motor 10A, is shown in FIG. 2. The synchronous reluctance motor 10B has the rotor 11 being structurally identical with that of the synchronous reluctance motor 10A and a rotor 15 being structurally different from the rotor 12 of the synchronous reluctance motor 10A. The rotor 15 has eight sets of outer side slot 15b and inner side slot 15c as shown in FIG. 2. The lengths of the outer side slots 15b and the inner side slots 15c in the radial directions of the rotor 15 are enlarged. The rotor 15 has eight sets of outer side permanent magnets 16a and the inner side permanent magnets 16b embedded in the outer side slots 15b and the inner side slots 15c, respectively.

The outer permanent magnets 16a and the inner permanent magnets 16b are manufactured to be thicker than the outer permanent magnets 13a and the inner permanent magnets 13b of the synchronous reluctance motor 10A. Because the outer side permanent magnets 16a and the inner side permanent magnets 16b are manufactured to be able to endure an irreversible magnetic field reduction that occurs due to applying the magnetic field of the stator 11 generated by the armature coils electrically fed on the stator 11 (not shown in FIG. 2), even if the outer side permanent magnets 16a and the inner side magnets 16b are made of a cheap magnetic material. Accordingly, in the rotor 15, the outer side slots 15a and the inner side slots 15b are formed to be larger in the radial directions of the rotor 15. Then the outer side permanent magnets 16a and the inner side permanent magnets 16b formed to be larger in the radial direction of the rotor 15 are embedded in the outer side slots 15a and the inner side slots 15b, respectively.

Opposite end portions in the outer side slots 15a and the inner side slots 15b that the permanent magnets are not embedded or packed have hollow spaces. The hollow spaces may be filled with an air or a preferable electrically insulated material.

Figure 3:
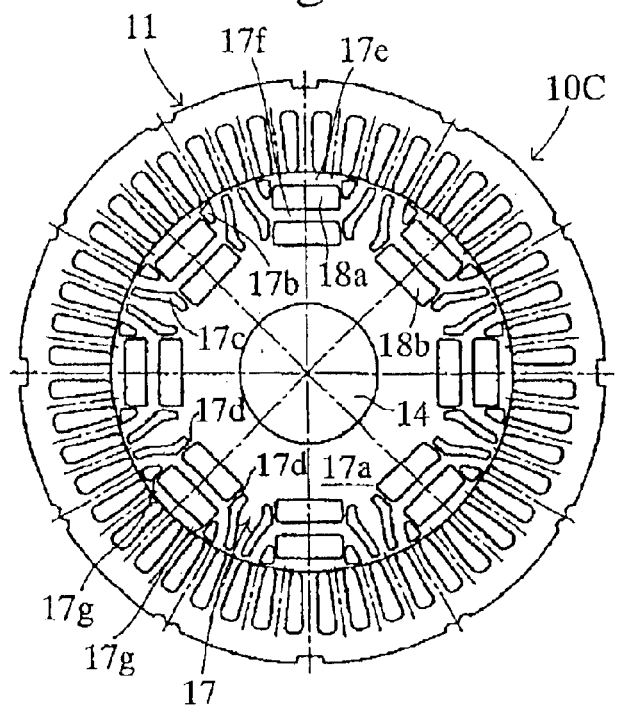
FIG. 3 shows a schematic drawing of another synchronous reluctance motor in accordance with a second aspect of the present invention.

A synchronous reluctance motor 10C, as partially structurally modified the synchronous reluctance motor 10B, is shown in FIG. 3. The synchronous reluctance motor 10C has the rotor 11 being structurally identical with that of the synchronous reluctance motor 10B and a rotor 17 being structurally different from the rotor 15 of the synchronous reluctance motor 10B. The rotor 17 has eight sets of outer side slot 17b and inner side slot 17c as shown in FIG. 3. In the rotor 17, each of the outer slots 17b and the inner side slots 17c is divided into a center portion and opposite end portions in the circumferential direction of the rotor 17 by bridging portions 17d and 17g. The bridging portion 17d is a portion of the rotor core 17a defined between the center portion and the end portions of the inner side slots 17c. The bridging portion 17g is a portion of the rotor core 17a defined between the center portion and the end portions of the inner side slots 17b. The rotor 17 further has eight sets of an outer side permanent magnet 18a and an inner side permanent magnet 18b to be embedded in the center portions of the outer side slots 17b and the inner side slots 17c, respectively. Each of the outer side permanent magnet 18b and the inner side permanent magnet 18c are held by the bridging portions 17g and 17d. Then the rotor 17 has eight sets of magnetic paths 17e and 17f for the magnetic fluxes to pass through formed in the rotor core 17a. As shown in FIG. 3, the magnetic paths 17e are formed between the outer side slots 17b and the outer periphery of the rotor 17, and the magnetic paths 17f are formed between the outer side slots 17b and the inner side slots 17c.

The synchronous reluctance motor 10C is constructed in order to endure centrifugal forces applied to the 17e, 17f, 18a, and 18b. As concerned for manufacturing productivity, the bridging portions 17d and 17g are preferably formed together with the outer side slots 17b and the inner side slots 17c by blanking with dies at the same time. Thus, the bridging portions 17d and 17g are formed of the same material of the rotor core 17a. When electric current is supplied to the armature coils (not shown in FIG. 3) wound around the magnetic pole portions of the stator 11, the magnetic fluxes generated by the stator 11 pass through the magnetic paths 17e and 17g. If a part of the magnetic fluxes leak through the bridging portions 17d and 17g, then the reluctance torque of the synchronous reluctance motor 10C may be decreased. To cope with the above torque reduction, the outer side permanent magnets 18a and the inner side permanent magnets 18b work effectively to constantly generate the magnetic fluxes in the bridging portions 17d and 17g, then magnetic resistances of the bridging portions 17d and 17g are increased. Thus, the part of the magnetic fluxes passed through the magnetic paths 17e and 17g can be effectively prevented from leaking through the bridging portions 17d and 17g.

Therefore, the present invention is preferably applied to the synchronous reluctance motors 10A to 10D.

Hereinafter, the synchronous reluctance motor of the present invention will be described referring a synchronous reluctance motor shown in FIG. 5.

Figure 5:
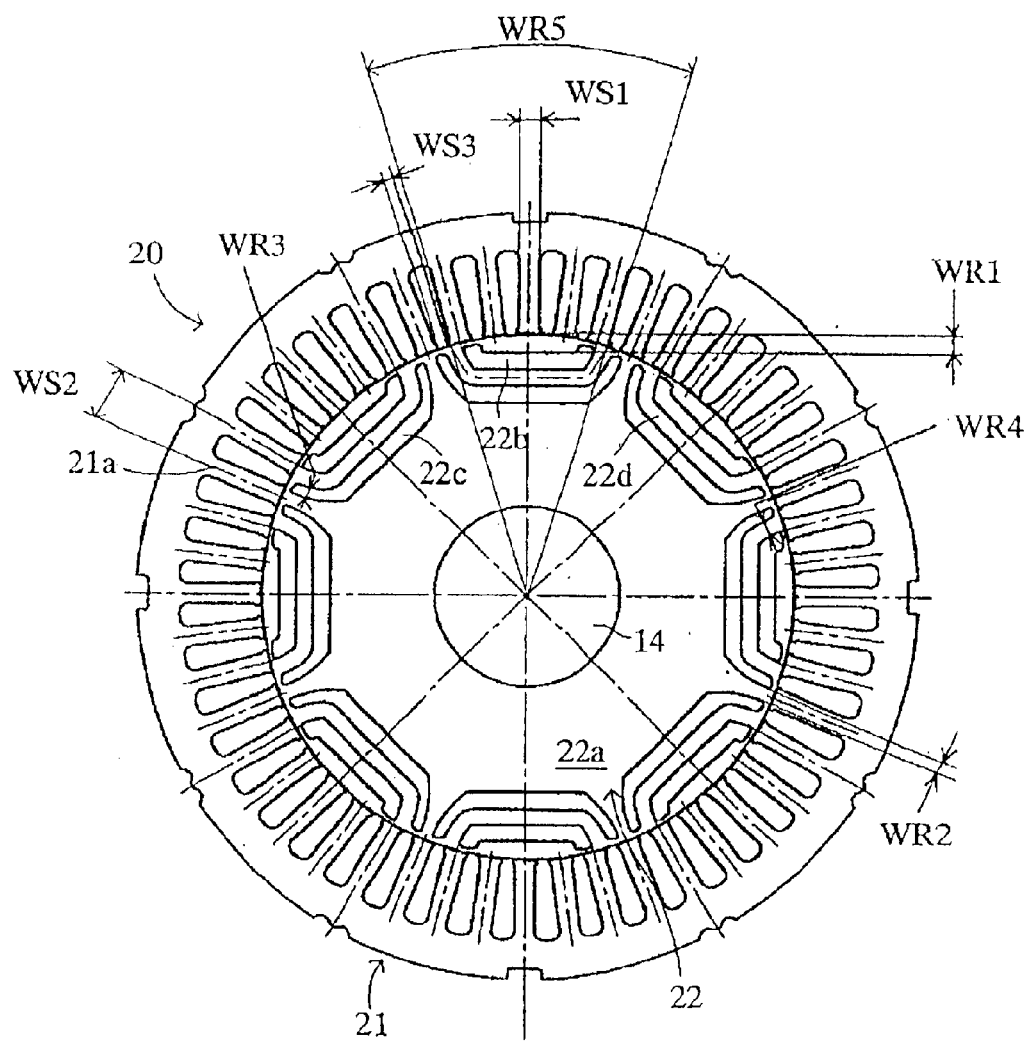
FIG. 5 shows a schematic drawing of the synchronous reluctance motor applied with the present invention.

The synchronous reluctance motor 20 in FIG. 5 is typical one of the synchronous reluctance motors 10A to 10D. In the synchronous reluctance motor 20, the stator of the motor is indicated as a stator 21 and the rotor is indicated as a rotor 22 in FIG. 5. The synchronous reluctance motor 20 is basically structurally the same as the synchronous reluctance motor 10A. Then, detailed descriptions about the structure of the rotor 22 except its dimensions are omitted.

The synchronous reluctance motor 20 has a stator 21 having the 48 stator magnetic pole portions, and the rotor 22 having 8 rotor magnetic pole portions. The synchronous reluctance motor 20 has magnetic paths between an outer periphery of the rotor 21 and outer side slots 22b. As shown in FIG. 5, the maximum widths of the magnetic paths in the rotor 22 are determined as maximum widths WR1. The widths of the stator magnetic pole portions of the stator 21 are determined as stator magnetic pole widths WS1. Moreover, the center-line of magnetic path between the outer side slot 22b and the inner side slot 22c in the rotor core 22a is crossed to the outer periphery of the rotor 22 at two cross points. Opening angles WR5 can be formed by lines connecting the cross point with rotational center of the rotor 22 are determined. Pitch angles WS2 are determined to be formed by center-lines of neighboring magnetic pole portions of the stator 21. A ratio of the number of the stator magnetic pole portions in the stator relative to the number of the rotor magnetic pole portions in the rotor is indicated as a number n. In the synchronous reluctance motor 20, the maximum widths WR1 are determined to be 0.7 to 1.3 times relative to the stator magnetic pole width WS1. The opening angle WR5 is determined to be the pitch angle WS2 multiplied by $((4.3\sim4.6)\times n/6)$.

For example, when the stator 22 has 48 stator magnetic pole portions and the rotor 22 has 8 rotor magnetic pole portions, the ratio n is 6. Then the opening angles WR5 are determined to be the pitch angles WS2 multiplied by between 4.3 and 4.6.

In FIG. 5, minimum distances defined between the inner side slots 22 neighbored in the circumferential direction of the rotor 22 are determined as minimum distances WR2. In the synchronous reluctance motor 20, the minimum distances WR2 are determined to be the stator magnetic pole widths WS1 multiplied by between ⅓ and 1.

In the synchronous reluctance motor 20, in detail, opening angles formed by lines connecting end portions of the outer side slots 22b adjacent to the outer periphery of the rotor 22 with the rotational center of the rotor 22 is determined to be approximately 4 times relative to the pitch angles WS2.

Other opening angles formed by lines connecting end portions of the inner side slots 22c adjacent to the outer periphery of the rotor 22 with the rotational center of the rotor 22 are determined to include one stator magnetic pole portion of the stator 21.

Opening widths WS3 defined between adjacent magnetic pole potions 21a are determined to be approximately equal to slot widths WR3 of the inner side slots 22c.

Figure 11:
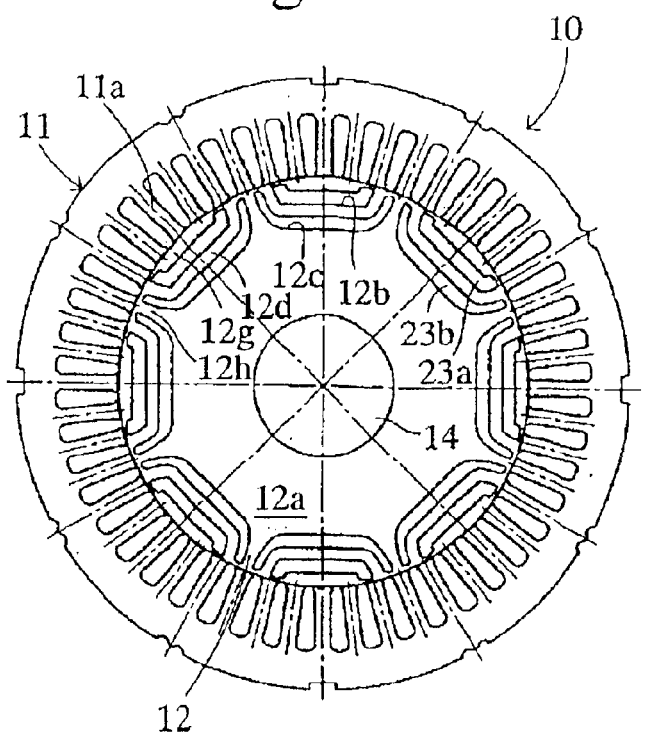
FIG. 11 shows a schematic drawing of a synchronous reluctance motor in accordance with ninth or thirteenth aspects of the present invention.
Figure 12:
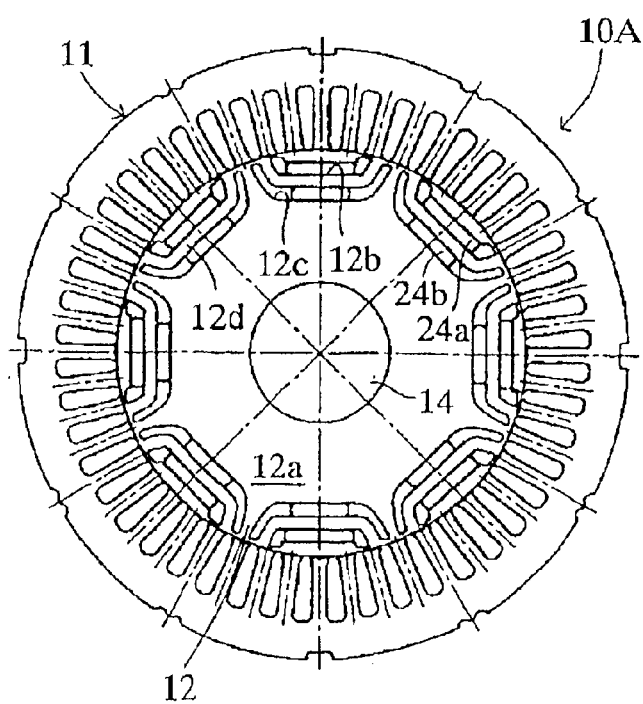
FIG. 12 shows a schematic drawing of a synchronous reluctance motor in accordance with ninth or thirteenth aspects of the present invention.

A synchronous reluctance motor 10E having permanent magnets having shapes which fill the outer side slots and the inner side slots disposed in the rotor 12 is shown in FIG. 11. The synchronous reluctance motor 10E has the stator 11, the rotor 12 as described in the synchronous reluctance motor 10D, and therefore detailed descriptions about the stator 11 and rotor 12 are omitted.

Specially in the synchronous reluctance motor 10E, outer side permanent magnets 23b and inner side permanent magnets 23a having predetermined performance are embedded in the pair of outer slot 12b and inner slot 12c to completely fill these slots, respectively, and then the 8 rotor magnetic pole portions are formed in the rotor 12.

As shown in FIG. 11, in the pair of outer permanent magnet 23b and inner side permanent magnet 23a, the outer permanent magnet 23b is arranged along the inner side permanent magnet 23a keeping the predetermined interval. Each portions facing each other of the outer side permanent magnet 23b and the inner side permanent magnet 23c is magnetized to be a different magnetic pole. The portions of the rotor core 12a defined between the outer side slots 12b and the inner side slots 12c are formed as magnetic paths 12d in the q-axis direction.

In the synchronous reluctance motor 10E, when the armature coils are disposed on the stator 11, the stator magnetic pole portions 11a wound by the armature coils generate the magnetic fluxes to pass through the stator 11 and the rotor 12. By the above magnetic fluxes, the magnet torque and the reluctance torque are generated in the rotor 12, and then the rotor 12 is driven by these torques to be rotated relative to the stator 11. The magnetic fluxes generated by the stator 11 pass through the magnetic paths 12d, 12f and 12h in the rotor core 12a, causing the inductances of the rotor core 12 in the q-axis direction to larger. The inductances of the rotor core 12 in the d-axis direction are made to be smaller because the magnetic paths 12d, 12f and 12h are separated in the d-axis direction. Therefore, a total torque amount composed of the magnet torque and the reluctance torque can be larger, and therefore the synchronous reluctance motor 10E can generate high torque and high mechanical output.

In the synchronous reluctance motor 10E of the present invention, a first magnetic flux amount as a total amount of the magnetic fluxes generated by the outer side permanent magnet 23a is determined to be larger than or equal to a second magnetic flux amount as a total amount of the magnetic fluxes generated by the inner side permanent magnet 23b when the center-lines in the circumferential direction of the rotor 12 of the outer side slot 12b and the inner side slot 12c neighbored each other in the radial direction of the rotor 12 is located in the center-line in the circumferential direction of the stator pole portion 11a as shown in FIG. 1, and when the armature coils (not shown in FIG. 11) are electrically fed.

To determine the first magnetic flux amount and the second magnetic flux amount as described above, according to the ninth and thirteenth aspects of the present invention, the outer side permanent magnets 23a and the inner side permanent magnet 23b are determined to be changed in shapes (dimensions in circumferential, radial or rotational axial direction of the rotor 12) and material depending on the locations of the outer side permanent magnets 23a and the inner side permanent magnets 23b. According to the tenth and fourteenth aspects of the present invention, the unit permanent magnets uniformly manufactured in shape and size may be disposed as permanent magnets in each of the outer side slots 12b and the inner side slots 12c. Thus the first magnetic flux amount and the second magnetic flux amount can be determined by changing the unit permanent magnets number depending on the outer side slot or the inner side slot. According to the eleventh and fifteenth aspects of the present invention, the first magnetic flux amount and the second magnetic flux amount can be determined by changing spaces defined between the permanent magnets disposed in the slots and inner peripheral surfaces of the slot in the radial direction of the rotor.

A synchronous reluctance motor 10F employing the ninth and thirteenth aspects of the present invention is shown in FIG. 11. In the synchronous reluctance motor 10F, outer side permanent magnets 24b and inner side permanent magnets 24a are formed of the same material, but the outer side permanent magnets 24a are formed to be longer than the inner side permanent magnets 24b in the circumferential direction of the rotor 12.

Figure 13:
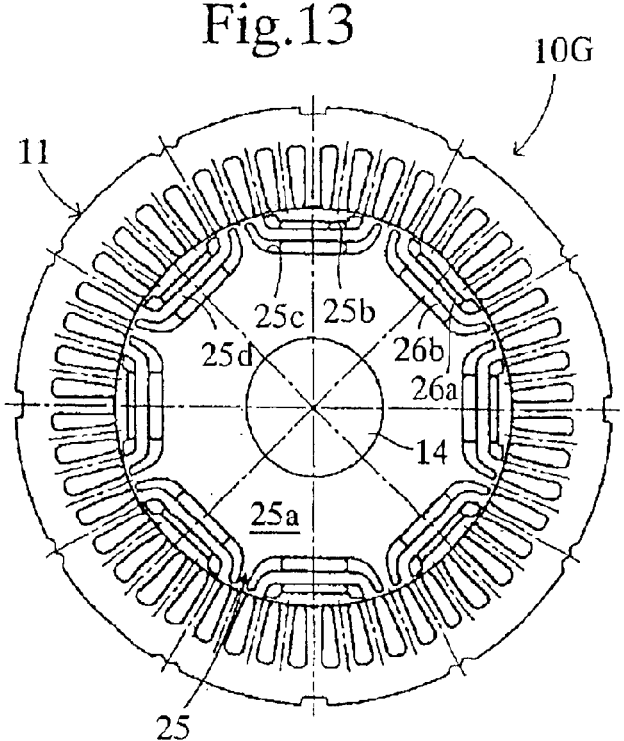
FIG. 13 shows a schematic drawing of a synchronous reluctance motor in accordance with tenth and fourteenth aspects of the present invention.

A synchronous reluctance motor 10G employing the tenth and fourteenth aspects of the present invention is shown in FIG. 13. In the synchronous reluctance motor 10G, the outer side permanent magnets 26a differ from the inner side permanent magnets 26b in the material forming each of the permanent magnet. The outer side permanent magnets 26a are formed of the material superior to that of the inner side permanent magnets 26b from a performance view point for generating the magnetic flux.

As shown in FIG. 13, the widths of the outer side slots 27b as distances between its both inner sides in the radial direction of the rotor 27 are determined to be larger than width of the inner side slots 27c as distances between both inner sides in the radial direction of the rotor 27. The outer side permanent magnets 26a of higher performance permanent magnets shaped thinner than the inner side permanent magnets 26b of general-use permanent magnets are disposed in the outer side slots 27b. Then, the rotor 27 also employs the tenth and fourteenth aspects of the present invention. The rotor 27 may have bridging portions between the outer side slots 27b and the inner side slots 27c such as bridging portions 27e in rotor 27 shown in FIG. 14, in order to endure centrifugal forces applied to the portions enclosing the outer side permanent magnets 26a and the inner side permanent magnets 26b in the rotor 27.

Figure 15:
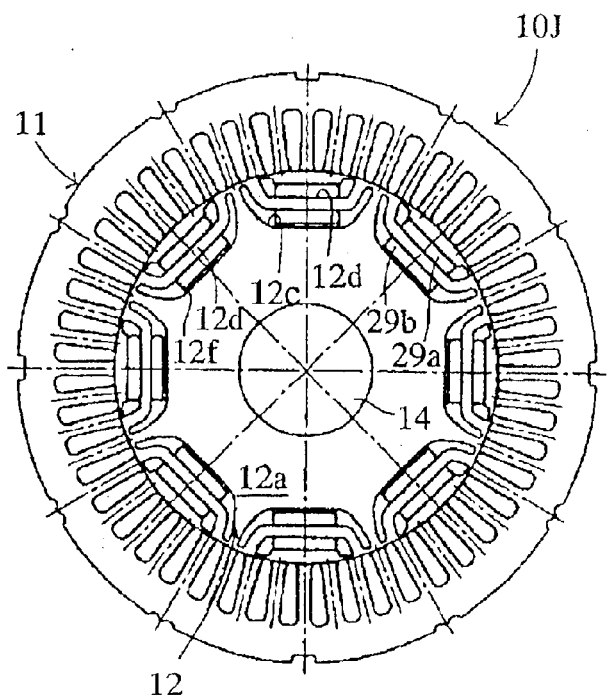
FIG. 15 shows a schematic drawing of a synchronous reluctance motor of the present invention.

A synchronous reluctance motor 10J employing the eleventh and fifteenth aspects of the present invention is shown in FIG. 15. In the synchronous reluctance motor 10J, spaces filled with non-magnetic material in the inner side slots 12c in the radial direction of the rotor 12 are formed. In the inner side slots 12c, non-magnetic material members 12f are disposed between the inner side permanent magnets 29b and the inner peripheral surface of the inner side slots 12c. The second total magnetic flux amount of the inner side permanent magnet 29b is determined by imposing the non-magnetic material members 12f between the inner side permanent magnets 29b and the inner peripheral surface of the inner side slots 12c relative to the first total magnetic flux amount.

In the synchronous reluctance motors 10F, 10G, 10H and 10J, two permanent magnets for the outer side permanent magnet and the inner side permanent magnet are disposed in the pair of the outer side slot and the inner side slot, respectively. But, the present invention can be implemented with another rotor in which three permanent magnets are disposed in a group of three slots formed in the radial direction of the rotor, and so on. But if the number of the slots in the group is increased, the manufacturing cost for the above rotor is increased. Then the above number of the slots is preferably determined to be 3.

First Embodiment

The synchronous reluctance motors 10D shown in FIG. 4, the synchronous reluctance motor according to the first aspect of the present invention was implemented, were evaluated how the relations between the maximum widths WR1 and the stator magnetic pole widths WS1 affect average torques, torque ripple ratios.

In the first embodiment, the synchronous reluctance motors 10D that the ratio of the maximum width WR1 (width defined between the outer periphery of the rotor 11 and the outer side slots 12b) relative to the stator magnetic pole widths WS1 (maximum widths WR1/stator magnetic pole widths WS1) are determined to be each of 0.55, 0.72, 0.9, 1.07, 1.24 and 1.41 are prepared. The above synchronous reluctance motors 10D were measured or evaluated as to their static torques, and then the static torque diagrams shown in FIG. 6 were obtained. By using the static torque waveforms in FIG. 6, the average torques and the torque ripple ratios were calculated.

Each of the above synchronous reluctance motors 10D has the 48 stator magnetic pole portions and the 8 rotor magnetic pole portions. The average torques are found as follows. First, the armature coils disposed in each of the stators 11 are fed with the electric current having rectangular waveform enough to rotate each of the rotor 11 for 120 electrical degrees. Next, 15 mechanical degrees ranges are selected in the static torque diagrams shown in FIG. 6 to have the maximum average amount of the static torques in the 15 mechanical degrees, then the average torques are found.

The torque ripple ratios are calculated by the proportions of differences between the minimum and maximum amounts of the static torques relative to the above average torques ((differences between the minimum and maximum amounts of the static torques)/(average torques)). The average torques (Nm) and the torque ripple ratios (%) of the synchronous reluctance motors, which the different ratios of maximum widths WR1 to stator magnetic pole widths WS1 (maximum widths WR1/stator magnetic pole widths WS1) are determined, are shown in Table 1.

TABLE 1

| SynRM (WR1/WS1) | Average Torque (Nm) | Torque Ripple Ratio (%) |
| --- | --- | --- |
| 0.55 | 46.8 | 109.0 |
| 0.72 | 48.7 | 96.9 |
| 0.90 | 49.4 | 85.1 |
| 1.07 | 49.4 | 81.3 |
| 1.24 | 49.0 | 79.3 |
| 1.41 | 48.5 | 77.8 |

NOTE:
SynRM means a synchronous reluctance motor.

Figure 6:
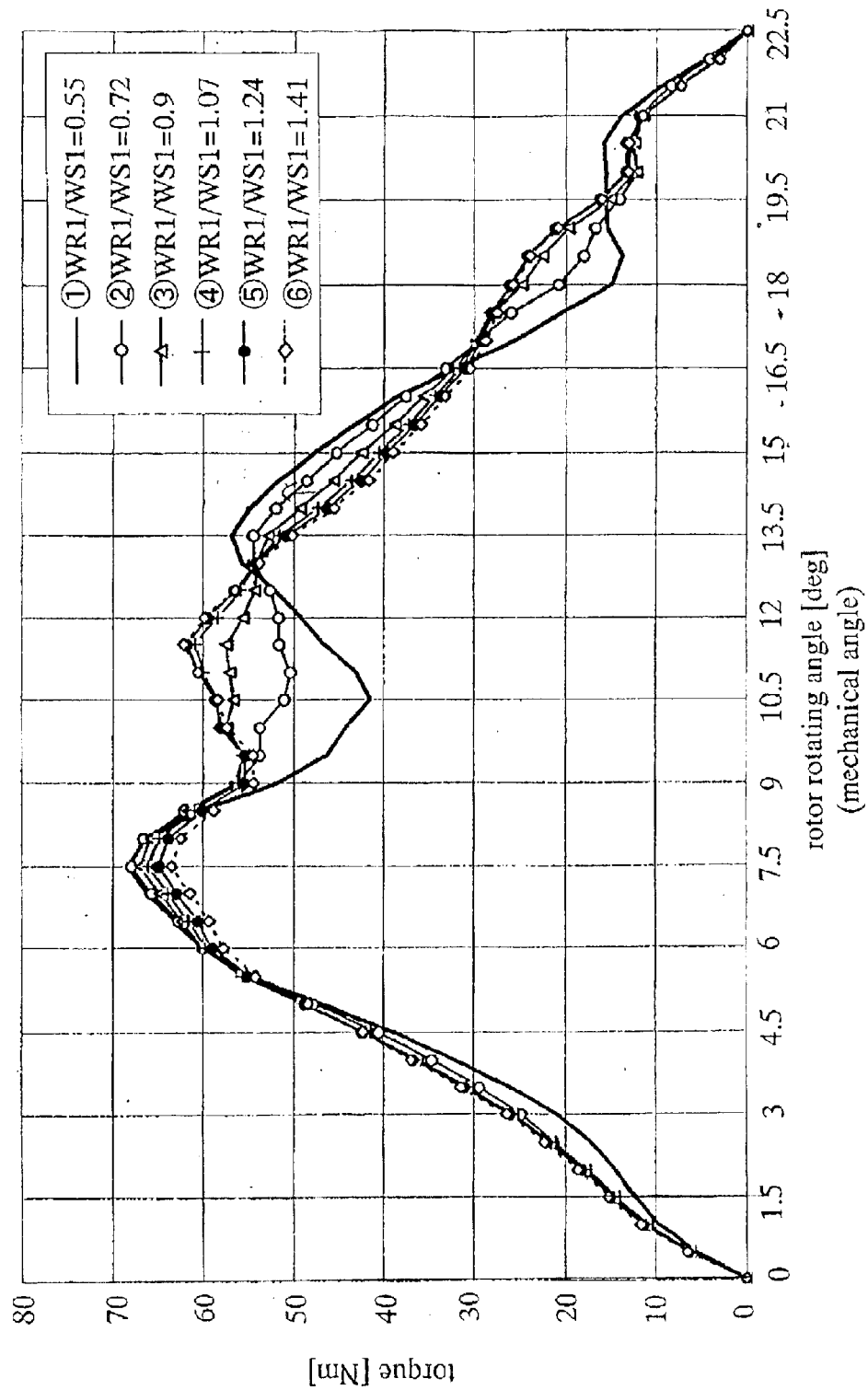
FIG. 6 shows a graph indicating a static torque wave of the synchronous reluctance motor of a first embodiment.

As seen in the torque diagram in FIG. 6 and Table 1, the average torques are increased as the ratios (maximum widths WR1/stator magnetic pole widths WS1) are increased. The ratios (maximum widths WR1/stator magnetic pole widths WS1) are maximized to be 0.90 to 1.07, and gradually decreased. The torque ripple ratios are surely decreased as the ratios (maximum widths WR1/stator magnetic pole widths WS1) are increased. The torque ripple ratios are drastically decreased when the ratios (maximum widths WR1/stator magnetic pole widths WS1) are more than 0.72. Especially, the torque ripple ratios are minimized when the ratios (maximum widths WR1/stator magnetic pole widths WS1) are determined between 1.24 and 1.41. Judging by the above results, first, the ratio (maximum widths WR1/stator magnetic pole widths WS1) are preferably determined to be larger than 0.72. Next, concerning that the ratios of the maximum widths WR1 to the stator magnetic pole widths WS1 (maximum widths WR1/stator magnetic pole widths WS1) become decreased after being larger than 1.07, the torque ripple ratios scarcely changed the as the ratios (maximum widths WR1/stator magnetic pole widths WS1) are larger than 1.24, and that the centrifugal forces applied to the rotor 11 negatively affect performance of the synchronous reluctance motor as the maximum widths WR1 becomes large, the ratios (maximum widths WR1/stator magnetic pole widths WS1) are preferably determined to be 0.7 to 1.3.

Second Embodiment

The several synchronous reluctance motors 10B, the another type of the synchronous reluctance motors having the permanent magnets that the seventh aspect of the present invention were implemented, were evaluated as to how the relationship between the maximum width WR1 and the stator magnetic pole widths WS1 affects the average torques, torque ripple ratios.

Figure 7:
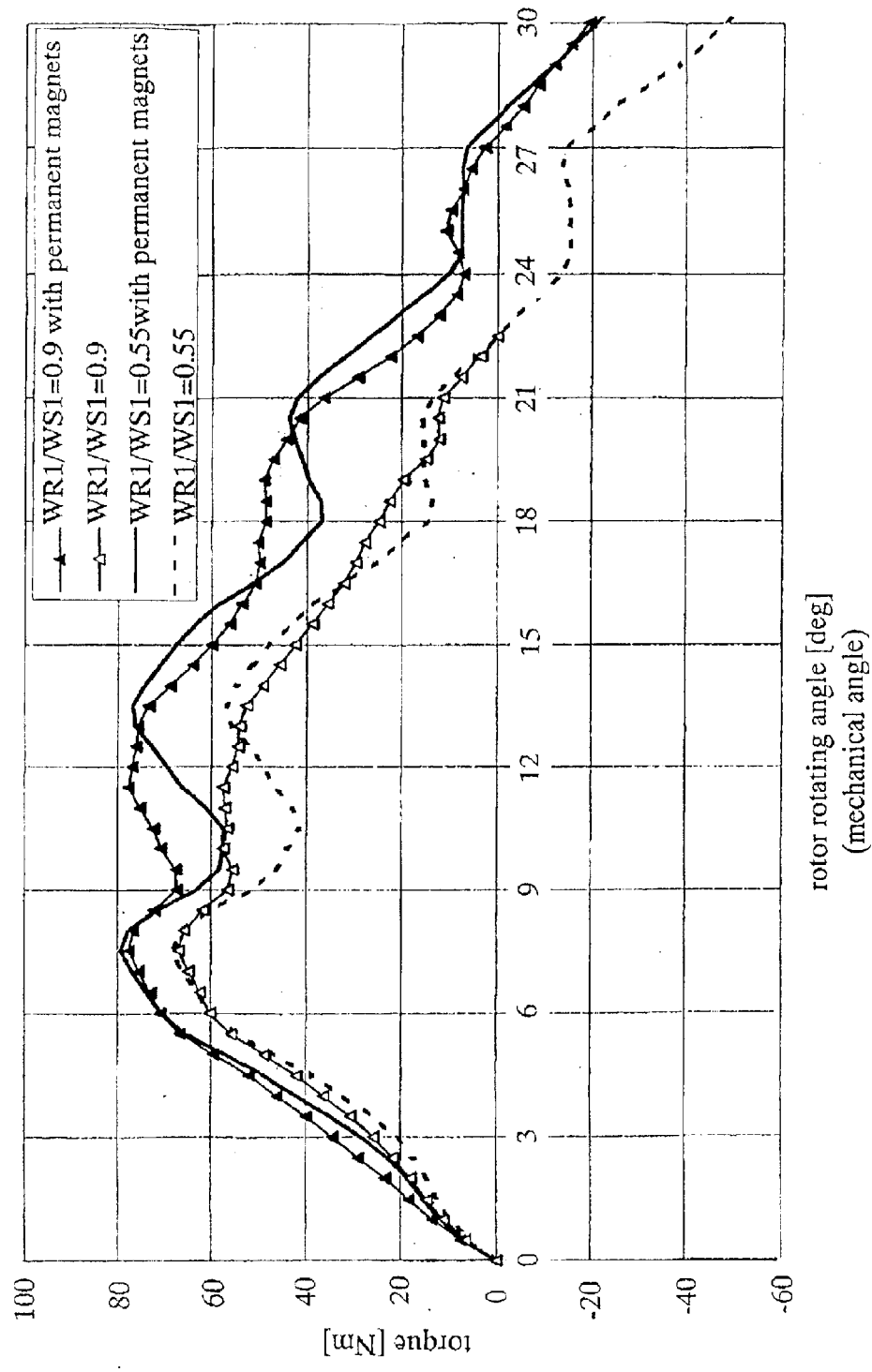
FIG. 7 shows a graph indicating the static torque wave of the synchronous reluctance motor of a second embodiment.

In the second embodiment, the synchronous reluctance motors 10B shown in FIG. 2 have cuboid-shaped permanent magnets embedded in the outer side slots 15b and the inner side slots 15c in the rotor. The synchronous reluctance motors 10B are further constructed to have the ratios (maximum widths WR1/stator magnetic pole widths WS1) determined to be 0.55 or 0.90. The two synchronous reluctance motors 10B were measured or evaluated their static torque, then the static torque diagrams in FIG. 7 were obtained. As seen in the torque diagrams in FIG. 7, the static torque of the synchronous motor having the ratio 0.55 was changed as almost same as that of the synchronous motor having the ratio 0.90 even after adding the permanent magnets to the rotors. But when the torques becomes large, the average torques were increased, while, the torque ripple ratios were decreased after adding the permanent magnets to the rotors. Independently of whether the permanent magnets are embedded in the rotors or not, the average torques when the ratio (maximum widths WR1/stator magnetic pole widths WS1) is determined to be 0.90 is superior to that when the ratio is determined to be 0.55.

Therefore, in the synchronous reluctance motor 10B that the present invention is implemented, by using the permanent magnets embedded in the outer and inner side slots formed in the rotor core, the torque ripple ratios can be decreased, and the average torques can be increased if the ratios (maximum widths WR1/stator magnetic pole widths WS1) are determined to be between 0.7 and 1.3.

Third Embodiment

The several synchronous reluctance motors 10D shown in FIG. 4 according to the first aspect of the present invention were evaluated as to how a relationship between the opening angles WR5 and the pitch angles WS2 affects the average torque and torque ripple ratio. The opening angles WR5 are formed by the lines connecting the two cross points formed by the center-line of magnetic path in the rotor core 12a and the outer periphery of the rotor 12 with the rotational center of the rotor 12. The pitch angles WS2 are formed by the center-lines of adjacent magnetic pole portion of the stator 11.

In the third embodiment, the synchronous reluctance motors 10D in which each of the ratios of the opening angles WR5 relative to the pitch angles WS2 was defined as any one of 4, 4.25, 4.4, 4.5 and 5.0 were prepared. The above synchronous reluctance motors 10D were measured or evaluated about their static torques, then the static torque diagrams shown in FIG. 8 were obtained. Even in the third embodiment, the average torques and the torque ripple ratios were calculated from the static torque waveform in FIG. 8.

Each of the synchronous reluctance motor 10D has the 48 stator magnetic pole potions, the 8 rotor magnetic pole portions. Moreover, in the above synchronous reluctance motors 10D, all the ratios (maximum widths WR1/stator magnetic pole widths WS1) are uniformly determined to be 0.9, the relationship between the minimum distances WR2 and stator magnetic pole widths WS1, the ratio (minimum distances WR2/stator magnetic pole widths WS1) are uniformly determined to be 0.75. The minimum distances WR2 are defined as the minimum distances between the adjacent stator magnetic pole portions. The average torques (Nm) and the torque ripple ratios (%) were found in the same way as in the first embodiment. The average torques and the torque ripples as calculated above are shown in Table 2.

TABLE 2

| SynRM (WR5/WS2) | Average Torque (Nm) | Torque Ripple Ratio (%) |
|---|---|---|
| 4 | 48.0 | 104.9 |
| 4.25 | 48.5 | 95.8 |
| 4.4 | 48.7 | 83.6 |
| 4.5 | 48.8 | 85.9 |
| 4.6 | 48.7 | 89.6 |
| 4.75 | 48.5 | 101.9 |
| 5 | 46.8 | 110.8 |

Figure 8:
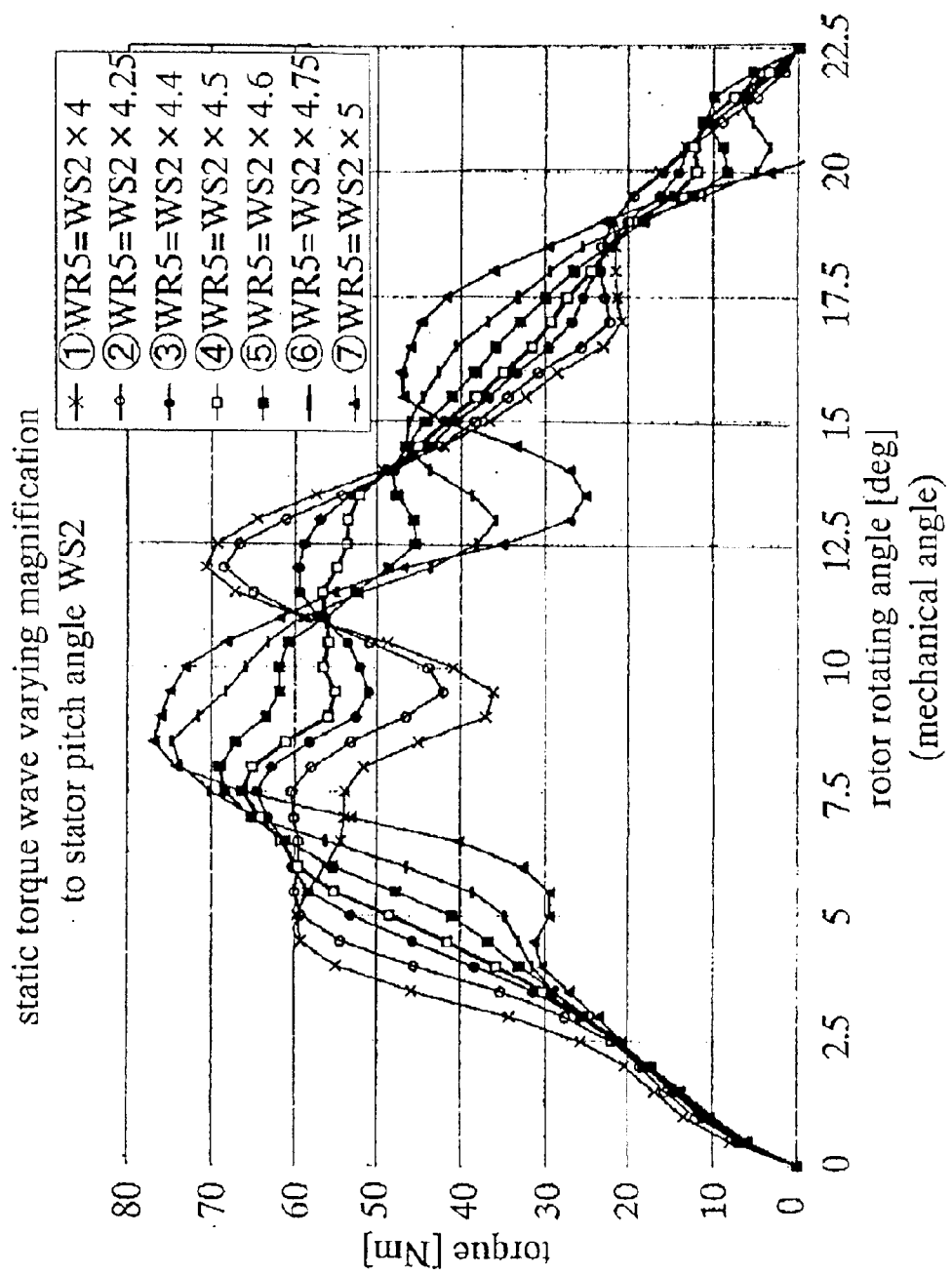
FIG. 8 shows a graph indicating the static torque wave of the synchronous reluctance motor of a third embodiment.
Figure 9:
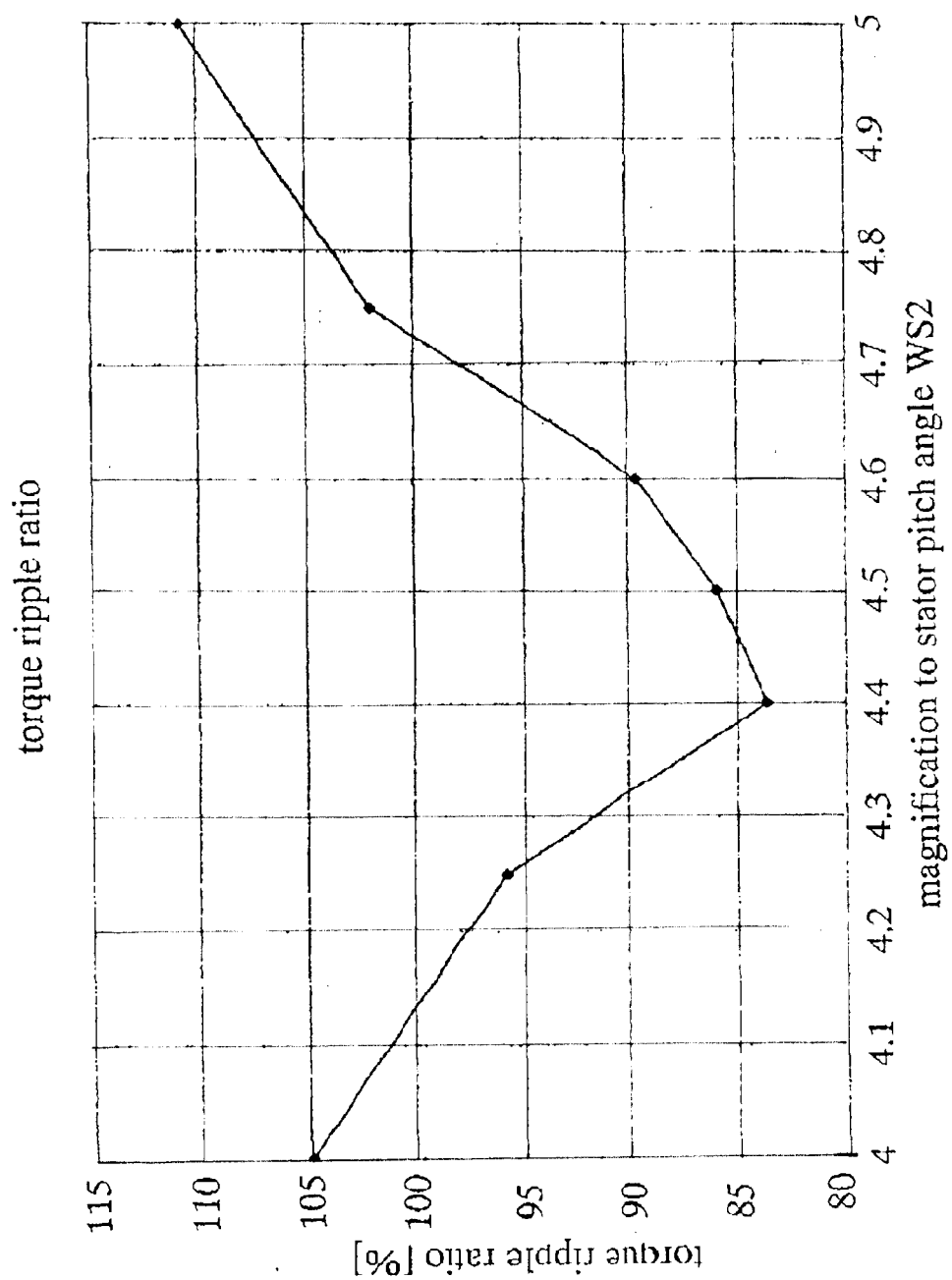
FIG. 9 shows a graph indicating change of a torque ripple occurring in the synchronous reluctance motor of a third embodiment.

As seen in the static torques in FIG. 8, Table 2, and FIG. 9, the average torques were maximized, and the torque ripple ratios were minimized when the ratio (opening angle WR5/pitch angle WS2) is 4.3 to 4.6. Therefore, the opening angle WR5 are preferably determined to be (4.3~4.6)×n/6 times to the pitch angle WS2.

Fourth Embodiment

The several synchronous reluctance motors 10D shown in FIG. 4 according to the first aspect of the present invention were evaluated as to how a relationship between the minimum distance WR2 and the stator magnetic pole widths WS1 affects the average torque and torque ripple ratio. The minimum distance WR2 is defined as the minimum distances between the adjacent stator magnetic pole portions in the circumferential direction of the rotor 12. The stator magnetic pole widths WS1 are defined as the widths of the stator magnetic pole portions of the stator 11.

In the fourth embodiment, the several synchronous reluctance motors 10D in which each ratio (minimum distance WR2/stator magnetic pole widths WS1) was defined as any one of 0, 0.33, 0.75, and 1 were prepared. The above synchronous reluctance motors 10D were measured or evaluated about their static torques, then the static torque diagrams shown in FIG. 10 were obtained. Even in the fourth embodiment, the average torques and the torque ripple ratios were calculated from the static torque waveform in FIG. 10.

Each of the synchronous reluctance motor 10D has the 48 stator magnetic pole potions, the 8 rotor magnetic pole portions. Moreover, in the above synchronous reluctance motors 10D, all the ratios (maximum widths WR1/stator magnetic pole widths WS1) are uniformly determined to be 0.9, the relation between the opening degrees WR5 and the pitch angles WS2, the ratio (opening degrees WR5/pitch angles WS2) are uniformly determined to be 4.5. The average torques (Nm) and the torque ripple ratios (%) were found in the same way as in the first embodiment. The average torques and the torque ripples calculated as above are shown in Table 3.

TABLE 3

| SynRM (WR2/WS1) | Average Torque (Nm) | Torque Ripple Ratio (%) |
|---|---|---|
| 0 | 42.3 | 96.8 |
| 0.33 | 47.0 | 77.0 |
| 0.75 | 48.8 | 85.9 |
| 1 | 48.6 | 82.4 |

NOTE:
SynRM means Synchronous reluctance motor.

Figure 10:
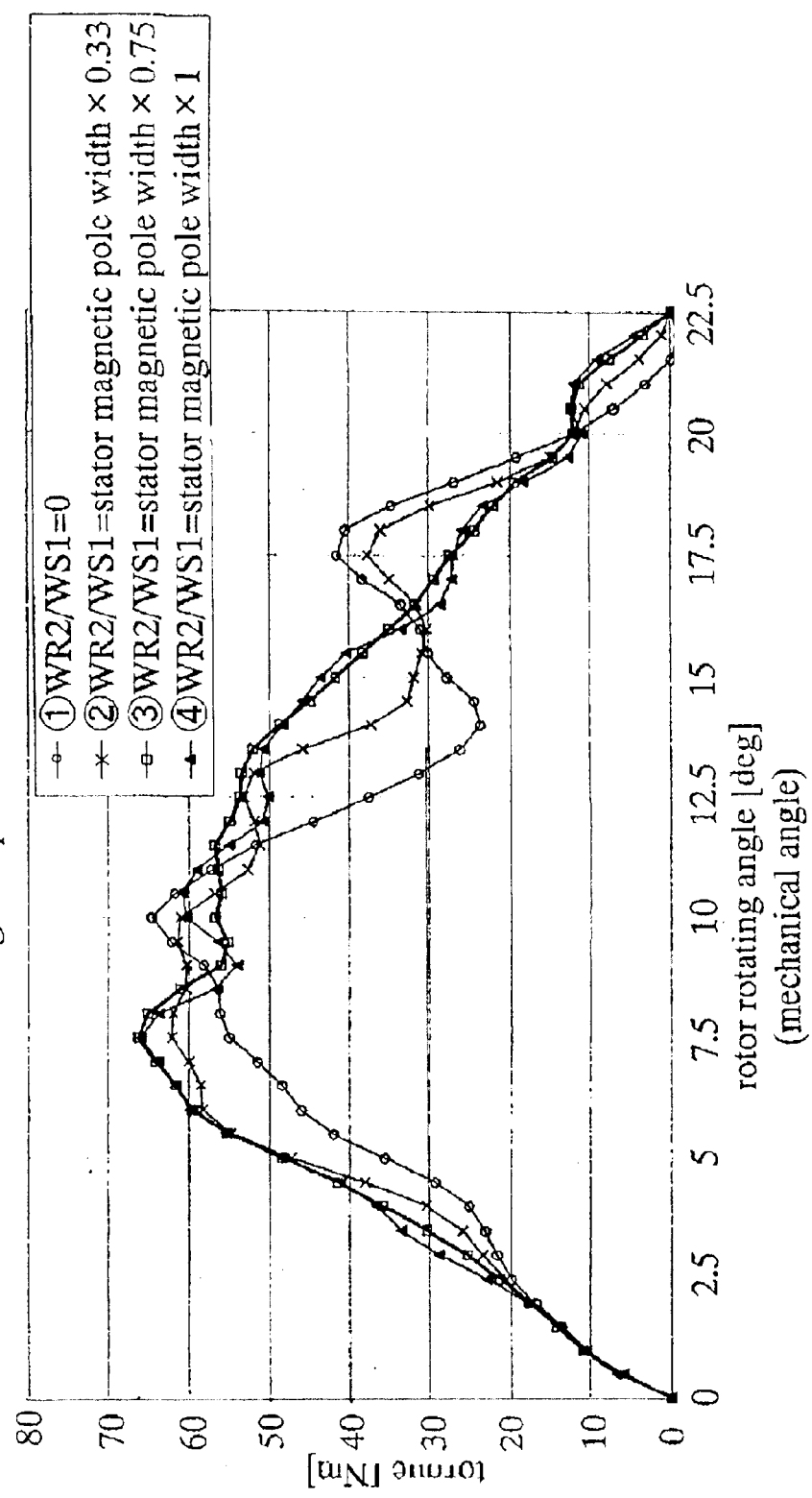
FIG. 10 shows a graph indicating a static torque wave of the synchronous reluctance motor of the second embodiment.

As seen in the static torques in FIG. 10 and Table 3, the average torques were increased, and the torque ripple ratios were decreased as the ratios (minimum distances WR2/stator magnetic pole widths WS1) tended to be increased. After the ratios (minimum distances WR2/stator magnetic pole widths WS1) were larger than 0.33, the average torques were remarkably increased, and the torque ripple ratios were decreased. Therefore, the ratio ratios (minimum distances WR2/stator magnetic pole widths WS1) are preferably determined to be 0.33 to 1.

Fifth Embodiment

Figure 14:
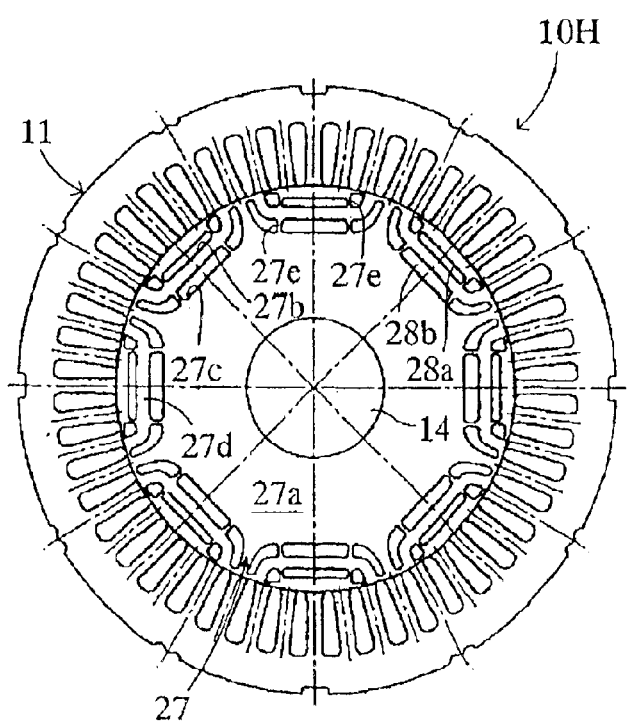
FIG. 14 shows a schematic drawing of a synchronous reluctance motor in accordance with eleventh and fifteenth aspects of the present invention.

The several synchronous reluctance motors 10D shown in FIG. 14, has a stator 21 and a rotor 22 that outer side permanent magnets 23a and inner side permanent magnets 23b are embedded.

Total amounts of another type of the synchronous reluctance motors as that of the second aspect of the present invention was implemented, and evaluated as to how a relationship between the minimum distance WR2 and the stator magnetic pole widths WS1 affects the average torque and torque ripple ratio.

Sixth Embodiment

Figure 16:
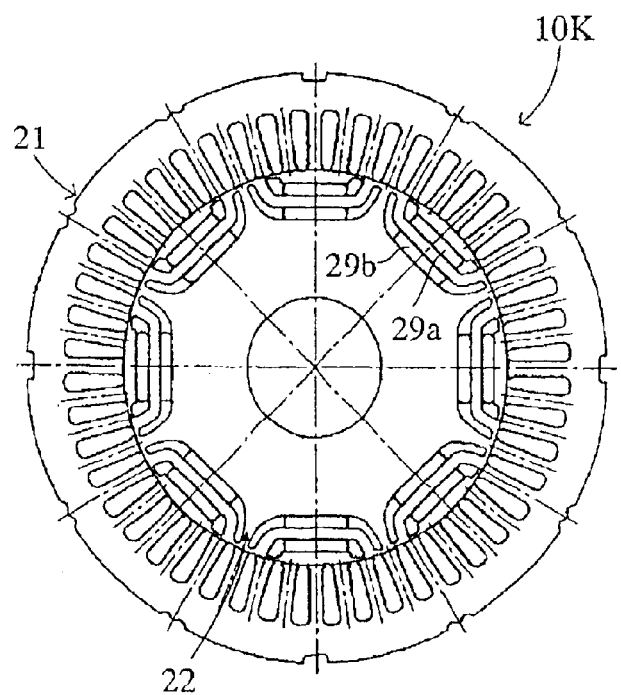
FIG. 16 shows a schematic drawing of a synchronous reluctance motor having structure implemented with the present invention in accordance with a sixth embodiment.
Figure 18:
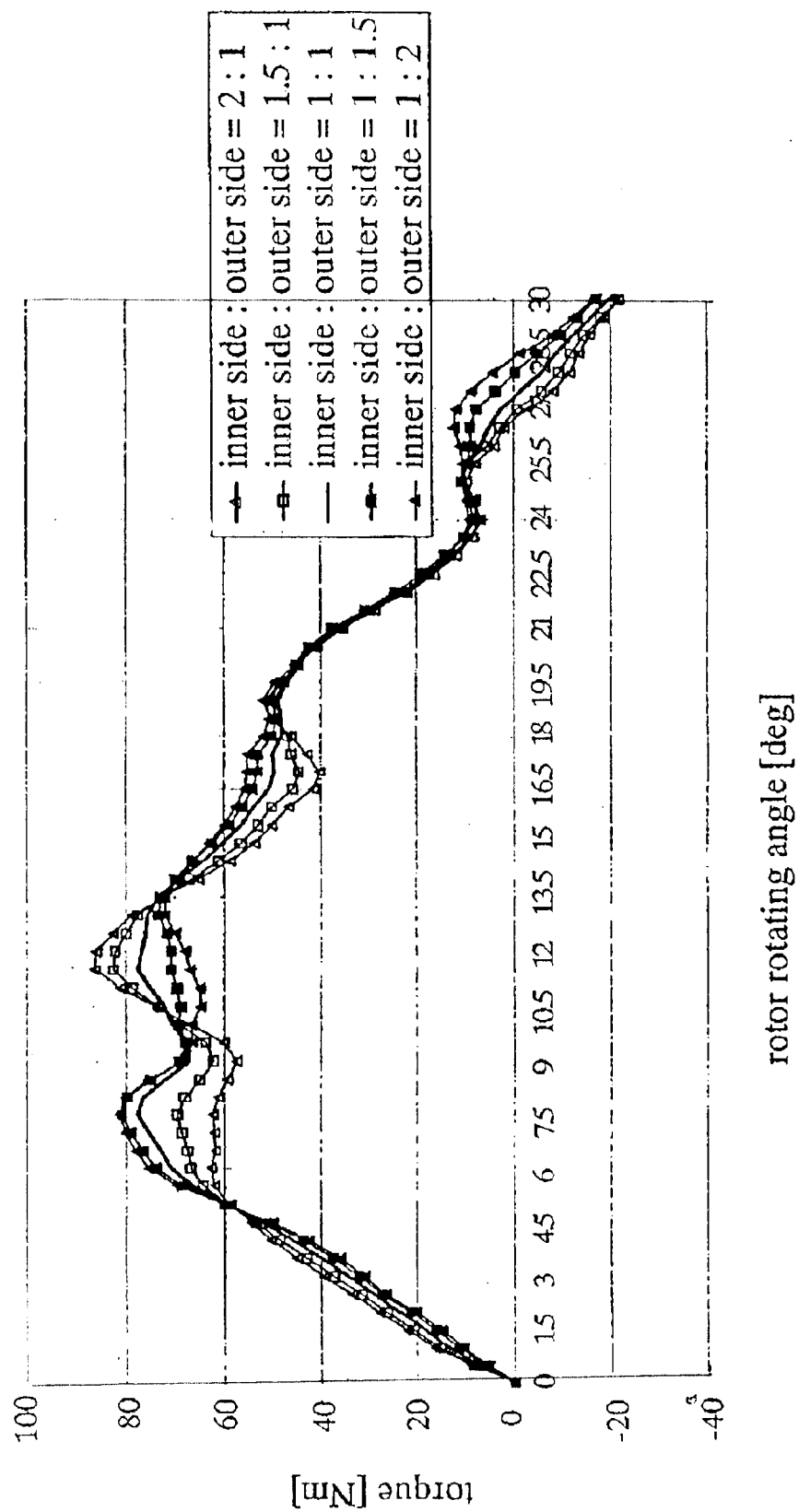
FIG. 18 shows a graph of static torques of synchronous reluctance motors of the sixth embodiment.
Figure 19:
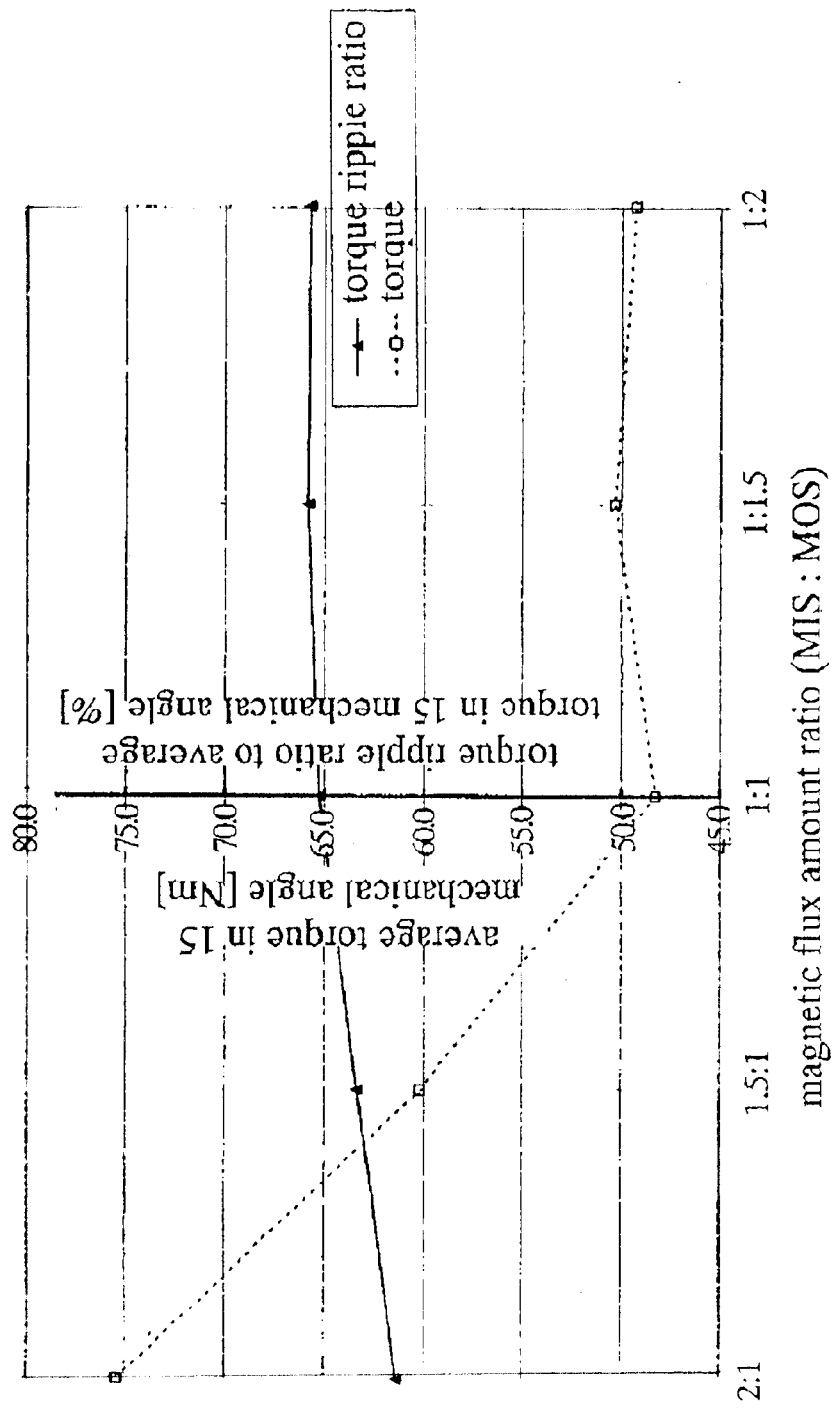
FIG. 19 shows a graph indicating a toque fluctuation and a torque ripple ratio of the synchronous reluctance motor of the sixth embodiment.
Figure 20:
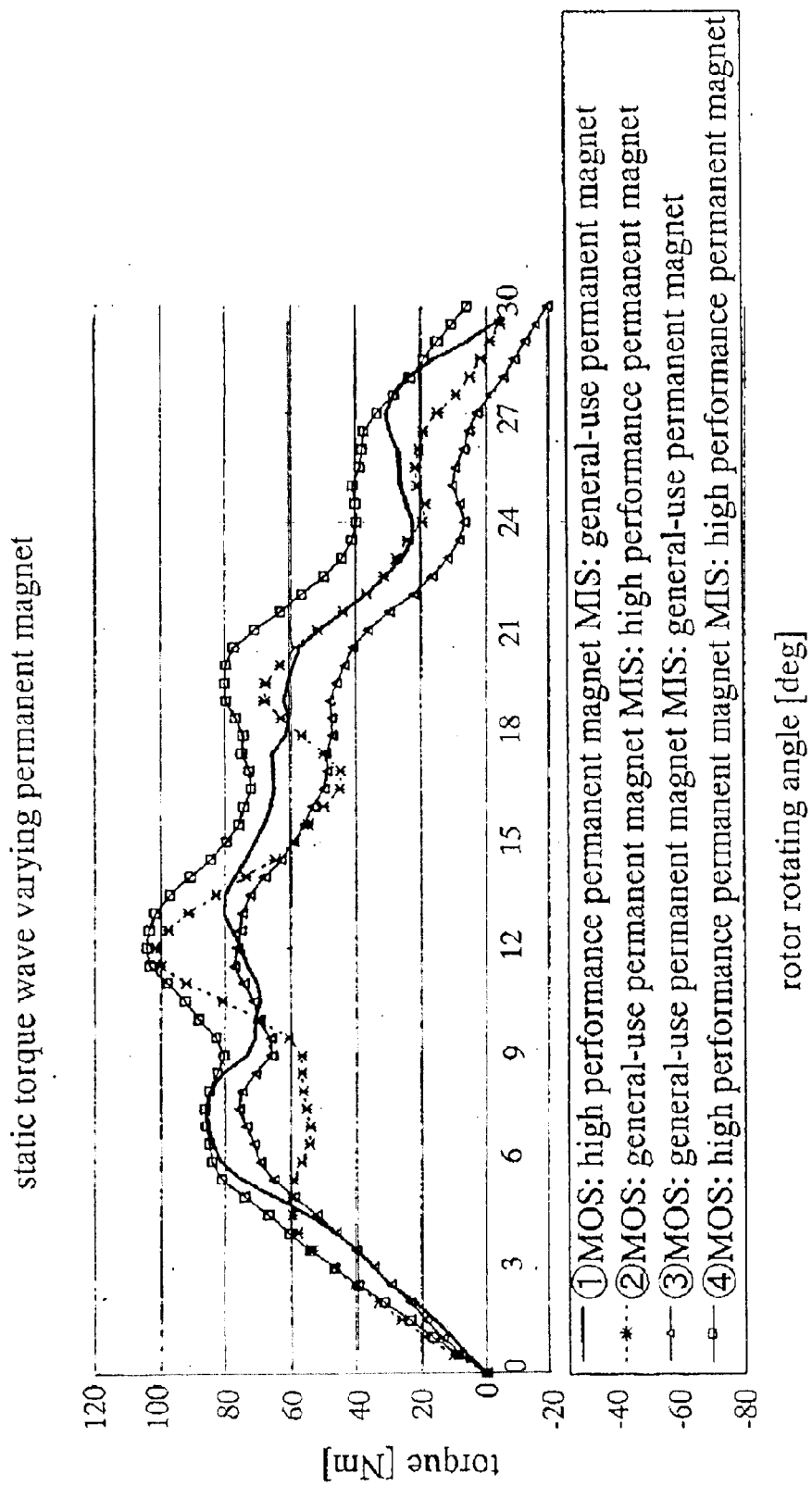
FIG. 20 shows a graph of static torques of synchronous reluctance motors of the seventh embodiment.

A synchronous reluctance motor 10K having a rotor 32 as shown in FIG. 16 is prepared. In the rotor 32, plurality of pairs of an outer side permanent magnet 33a and an inner side permanent magnet 33b are embedded. In each of the pairs of permanent magnet, the outside permanent magnet 33a and the inner side permanent magnet 33b are arranged in the radial direction of the rotor 32. The several synchronous reluctance motors 10K were evaluated as to how an equivalent the total magnetic flux amount of the outer side permanent magnets 33a and the inner side permanent magnet 33b affects the average torque and torque ripple ratio. The synchronous reluctance motors were measured for their static torques. The results of the above measurements are shown in FIG. 18 (the static torque waveforms) and FIG. 19 (the average torques and the torque ripple ratios).

Each of the synchronous reluctance motors 10K has the 48 stator magnetic pole portions and the 8 rotor magnetic pole portions.

The average torques of the synchronous reluctance motors 10K are found as follows. First, the armature coils disposed in each of the stators 31 are fed with the electric current having rectangular waveform enough to rotate each of the rotor 31 for 120 electrical degrees. Next, 15 mechanical degrees ranges are selected in the static torque diagrams shown in FIG. 18 to have the maximum average amount of the static torques, then the average torques are found. The torque ripple ratios are found as ratios of the differences between maximum and minimum toque amounts relative to the average torque.

In the synchronous reluctance motors 10K, total amount of the first total magnetic flux amounts due to the outer side permanent magnets 33a and the second total magnetic flux amounts due to the inner side permanent magnets 33b is determined to be constant, but the proportions between the second total magnetic flux amounts and the first total magnetic flux amounts are determined as 2:1, 5:1, 1:1, 1:1.5 and 1:2. As shown in FIG. 8 and FIG. 9, the synchronous reluctance motors 10K in which the first total magnetic flux amount is determined to be larger than the second total magnetic flux amount can achieve satisfactory results if the average torques becomes large and the torque ripple ratios become small.

Seventh Embodiment

Several synchronous reluctance motors having a plurality of pairs of the permanent magnets in the rotor are prepared. In the rotor, plurality of pairs of an outer side permanent magnet and an inner side permanent magnet are embedded next to each other in the radial direction. In the several reluctance motors of this embodiment, the high performance permanent magnets and the general-use permanent magnets inferior to the high performance permanent magnet in view of performance are employed. The several synchronous reluctance motors of this embodiment were evaluated as to how combinations of the high performance permanent magnet and the general-use permanent magnet embedded in the rotor affects the average torque and torque ripple ratio. The high performance permanent magnet formed of NdFeB-magnet and the general-use permanent magnet formed of ferrite are used in this embodiment.

Two synchronous reluctance motors having a structure in accordance with the ninth and thirteenth aspects of the present invention are prepared in this embodiment. The synchronous reluctance motor 30A as one of the above synchronous reluctance motors has the same structure as that of the synchronous reluctance motor 10K shown in FIG. 16 and uses the general-use permanent magnets as the outer side permanent magnets and the inner side permanent magnets. The synchronous reluctance motor 30B as another one of the above synchronous reluctance motors has the same structure as that of the synchronous reluctance motor 10K in FIG. 16 and uses the high performance magnets as the outer side permanent magnets and the inner side permanent magnets.

A synchronous reluctance motor having a structure in accordance with the tenth and fourteenth aspects of the present invention is prepared in this embodiment. The synchronous reluctance motor 30D like the above synchronous reluctance motors has the same structure as that of the synchronous reluctance motor 10G shown in FIG. 13 and uses the general-use permanent magnets as the outer side permanent magnets and the general-use permanent magnets as the inner side permanent magnets. Moreover, a synchronous reluctance motor 30C having the same structure as that of the synchronous reluctance motor 10G in FIG. 13 and not having any the permanent magnets in the rotor 12 is constructed.

A synchronous reluctance motors having structure in accordance with the eleventh and fifteenth aspects of the present invention is prepared in this embodiment. The synchronous reluctance motor 30E shown in FIG. 17 has the outer side permanent magnets and the inner side permanent magnets formed to be in inverse order according to size thereof relative to the synchronous reluctance motor 10G in FIG. 13. The synchronous reluctance motor 30E uses the general-use permanent magnets as the outer side permanent magnets and uses the high performance permanent magnets as the inner side permanent magnets.

Figure 21:
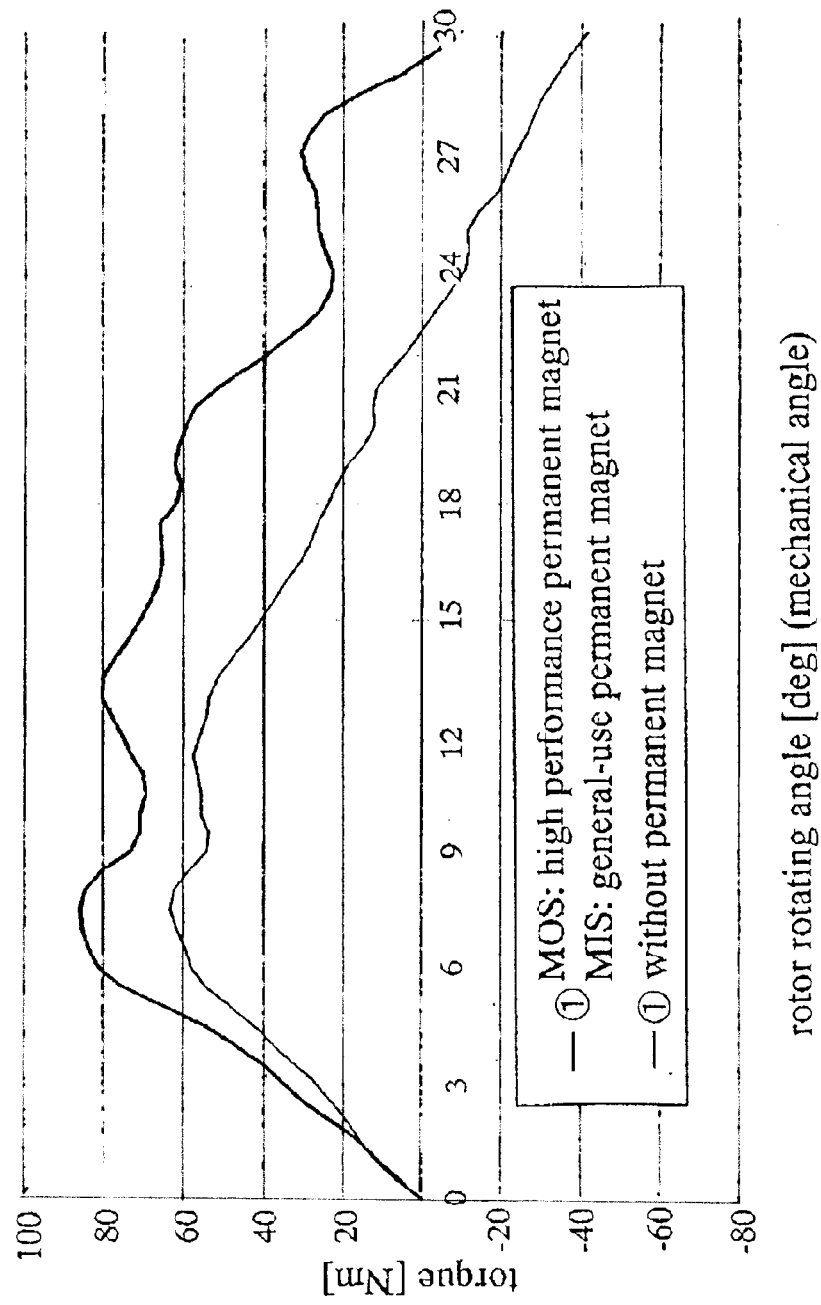
FIG. 21 shows a graph indicating a toque fluctuation and a torque ripple ratio of the synchronous reluctance motor of the seventh embodiment.

The order of synchronous reluctance motors 30A, 30B, 30C, 30D and 30E according to the materials of the permanent magnets, the magnetic flux ratio as the proportion between the first total magnetic flux amount and the second total magnetic flux amount, the average torques, the torque ripple ratios, and the manufacturing costs are shown in Table 4. Static torque waveforms of the above synchronous reluctance motors are shown in FIG. 21.

In Table 4, SynRM means the synchronous reluctance motor. MOS means the outer side permanent magnet. MIS means the inner side permanent magnet. (High) and (Gen) means high performance and general-use, respectively. The magnetic flux amount ratio means a ratio between the magnetic fluxes generated by the permanent magnets in the rotor when the armature coils are not electrically fed, and when each rotor is located to each stator shown in each figure.

TABLE 4

Figure 17:
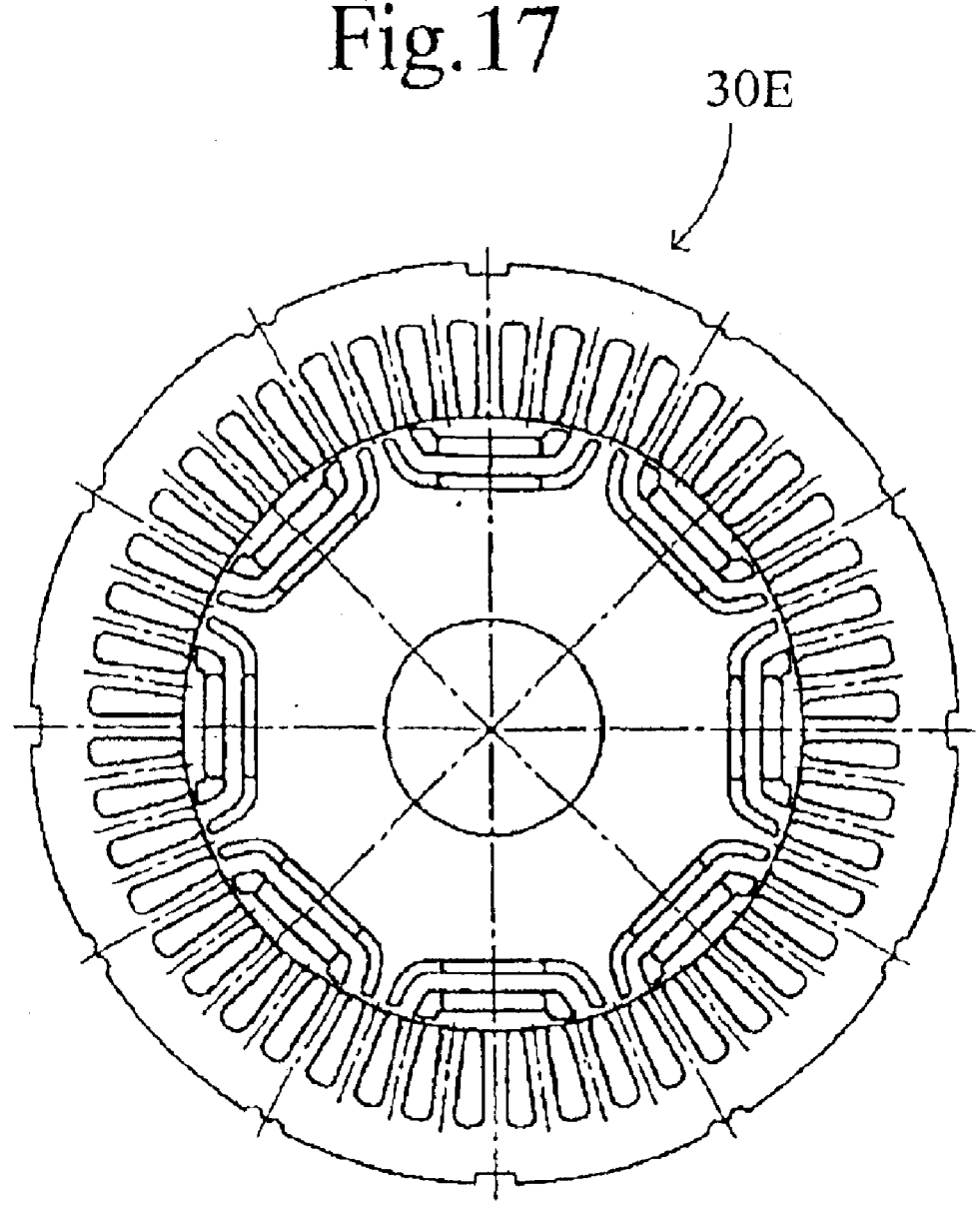
FIG. 17 shows a schematic drawing of a synchronous reluctance motor having another structure implemented with the present invention of embodiments.
Figure 22:
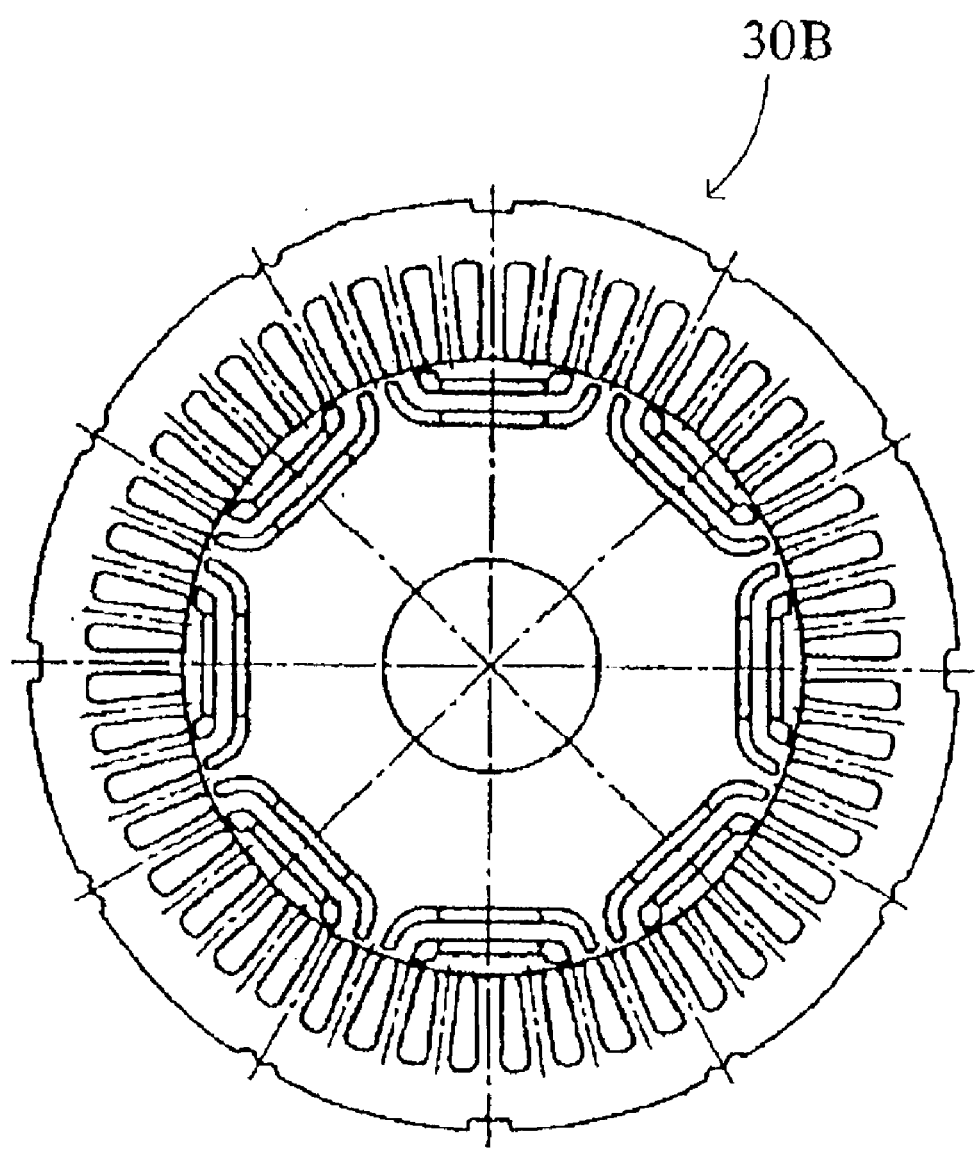
FIG. 22 shows a schematic drawing of another synchronous reluctance motor of the present invention.

| SynRM | | 30A | 30B | 30C | 30D | 30E |
|---|---|---|---|---|---|---|
| Structure is shown in | | FIG. 6 | FIG. 22 | FIG. 13 | FIG. 13 | FIG. 17 |
| Magnetic Flux Ratios | MOS | 1 (Gen) | 2 (High) | — | 2 (High) | 1 (Gen) |
| | MIS | 1 (Gen) | 2 (High) | — | 1 (Gen) | 2 (High) |
| Average Torques | Quantity | 64.3 | 85.2 | 48.0 | 72.7 | 66.2 |
| | Ratio | 0.75 | 1 | 0.56 | 0.85 | 0.78 |
| (in ascending order | Order | 4 | 1 | 5 | 2 | 3 |

TABLE 4-continued

| SynRM | | 30A | 30B | 30C | 30D | 30E |
|---|---|---|---|---|---|---|
| Torque Ripple Ratios (in descending order) | quantity | 48.7 | 37.0 | 83.2 | 43.3 | 85.5 |
| | Ratio | 1.32 | 1 | 2.25 | 1.17 | 2.31 |
| | Order | 3 | 1 | 4 | 2 | 5 |
| Manufacturing Costs (in descending order) | | 4 | 1 | 5 | 2 | 2 |

NOTES:
Average Torque: Average Torque of SynRM rotating 15 degrees (mechanical angle)
Torque Ripple Ratio: (Difference between Maximum and Minimum Torque)/Average Torque
Ratio: Ratio of Average Torque or Torque Ripple of SynRM 30 relative to another SynRMs
(Gen): General-use permanent magnet
(High): High Performance permanent magnet As obviously in FIG. 10, the synchronous reluctance motors in descending order according to the average torque are taken as 30B (the ratio is 1), 30D (the ratio is 0.85), 30E (the ratio is 0.78), 30A (the ratio is 0.75), and 30C (the ratio is 0.56). The synchronous reluctance motors in ascending order according to the torque ripple ratio are 30B (the ratio is 1), 30D (the ratio is 1.17), 30A (the ratio is 1.32), 30C (the ratio is 2.25), and 30E (the ratio is 2.31). The synchronous reluctance motors in ascending order according to the manufacturing cost are 30B, 30D, 30A and 30C.

FIG. 21 shows the differences of the static toque waveforms between the synchronous reluctance motors 30D and 30C, in other words, between the synchronous reluctance motors having the permanent magnets or not. The ratio of the average torque of the synchronous reluctance motor 30C not employing the permanent magnets relative to that of the synchronous reluctance motor 30D employing the permanent magnets is 0.66. Therefore, in the synchronous reluctance motor 30D, the reluctance torque is mainly contributed to the average torque. The static torque waveform of the synchronous reluctance motor 30C is confirmed to be approximately matched to the static torque waveforms of the synchronous reluctance motors 30A, 30B and 30E without the permanent magnets.

In the synchronous reluctance motors 30A, 30D and 30E manufactured at low price compared to the synchronous reluctance motor 30B by employing the general-use permanent magnets, the synchronous reluctance motor 30D is superior from the view point of the average torque and the torque ripple ratio between the synchronous reluctance motors 30D and 30E employing the permanent magnets formed of the same material and in different shapes. The average torque of the synchronous reluctance motor 30E is smaller than that of the synchronous reluctance motor 30D, because the magnetic fluxes generated by the inner side permanent magnets (MIS) are thought to prevent the magnetic fluxes from generating reluctance torque.

The average torques of both the synchronous reluctance motors 30A and 30E are approximately equal. But the synchronous reluctance motor 30A is superior from the view point of the torque ripple ratio and the manufacturing cost compared to the synchronous reluctance motor 30E. In comparison between the synchronous reluctance motors 30A and 30D, the synchronous reluctance motor 30D is better than 30A in terms of the average torque, the torque ripple ratio and the centrifugal force resistance. But the manufacturing cost is increased for the synchronous reluctance motor 30D to be constructed.

In comparison between the synchronous reluctance motors 30B and 30D, the ratio of the average torque of the synchronous reluctance motor 30D relative to that of the synchronous reluctance motor 30B is 0.85. The ratio of the torque ripple ratio of the synchronous reluctance motor 30D relative to the synchronous reluctance motor 30B is 1.17. The usage ratio of the high performance permanent magnet in the synchronous reluctance motor 30D relative to that in the synchronous reluctance motor 30B is 0.5. In synchronous reluctance motor 30D, the average torque partially reduced compared to that of the synchronous reluctance motor 30D, the usage ratio of the high performance is reduced compared to half of that of the synchronous reluctance motor 30D, then the manufacturing cost of the synchronous reluctance motor 30D can be reduced.

Therefore, the synchronous reluctance motor having high performance (high average torque and low torque ripple) and formed compactly can be produced by constructing as that the first total magnetic flux amount of the outer side permanent magnets are determined to be larger than the second magnetic flux amount of the inner side permanent magnet.

Having now fully described the invention, it will be apparent to some of ordinary skill in the art that many changes and modifications can be made without departing from the sprit or scope of the invention as set forth herein.

What is claimed is:

1. A synchronous reluctance motor comprising:
   a stator having a predetermined number of toothed stator magnetic pole portions wound by armature coils, and
   a rotor rotatably supported at an inner peripheral surface of the stator and having a pair of slots formed in a circumferential direction of the rotor and extending along the inner periphery of the stator with a predetermined interval,
   wherein the pair of slots includes an outer side slot formed at an outer periphery side of the rotor and an inner side slot formed at an inner side of the rotor, both the outer side slot and the inner side slot extend toward the outer peripheral surface of the rotor to form a rotor magnetic pole portion, and wherein a width of an effective magnetic path between the outer periphery of the rotor and the outer side slot is defined based on a width of a stator magnetic pole portion multiplied by a predetermined number in a range of 0.7 and 1.3; and
   wherein
   a phase number of the synchronous reluctance motor is m,
   a ratio of a number of the stator magnetic role portions relative to a number of the rotor magnetic pole portions is n,
   a first opening angle is formed by lines connecting a rotational center of the rotor with two cross points, the two cross points formed by the outer periphery of the rotor and a center-line of a magnetic flux path between the outer side slot and the inner side slot,
   a second opening angle is formed by center-lines of adjacent stator magnetic pole portions in the circumferential direction of the stator, and
   wherein the first opening angle is determined based on the second opening angle multiplied by (n/2 m) and a second predetermined number.

2. The synchronous reluctance motor according to claim 1, wherein the second predetermined number is in a range of 4.3 and 4.6.

3. The synchronous reluctance motor according to claim 1, wherein a minimum inter slot distance in the circumferential direction of the rotor is determined based on the stator magnetic pole width multiplied by a second predetermined number.

4. The synchronous reluctance motor according to claim 3, wherein the second predetermined number is determined to be in a range of ⅓ and 1.

5. The synchronous reluctance motor according to claim 1, wherein a permanent magnet is disposed in each of the outer side slot and the inner side slot formed in the rotor.

6. The synchronous reluctance motor according to claim 5, wherein the permanent magnet disposed in the outer side slot is regarded as an outer side permanent magnet, the permanent magnet disposed in the inner side slot is regarded as an inner side permanent magnet, in the circumferential direction of the rotor, the portions of the inner side permanent magnet and the outer side permanent magnet facing each other are magnetized to have different magnetic poles, a first total magnetic flux of the outer side permanent magnet is determined to be larger than or equal to a second total magnetic flux of the inner side permanent magnet when the center-line of the outer side slot and the inner side slot in a circumferential direction of the rotor is adjacent one or more of the center-lines of the stator magnetic pole portions in the circumferential direction of the stator, and when the armature coils winding around the stator magnetic pole portions are not electrically fed.

7. A synchronous reluctance motor comprising:

a stator having a predetermined number of toothed stator magnetic pole portions wound by armature coils, and a rotor rotatably supported at an inner peripheral surface of the stator and having a pair of slots formed in a circumferential direction of the rotor and extending along the inner periphery of the stator with a predetermined interval, wherein the pair of slots includes an outer side slot formed at an outer periphery side of the rotor and an inner side slot formed at an inner side of the rotor, both the outer side slot and the inner side slot extend toward the outer peripheral surface of the rotor to form a rotor magnetic pole portion, and wherein a width of an effective magnetic path between the outer periphery of the rotor and the outer side slot is defined based on a width of a stator magnetic pole portion multiplied by a predetermined number in a range of 0.7 and 1.3, wherein a permanent magnet is disposed in each of the outer side slot and the inner side slot formed in the rotor, wherein the permanent magnet disposed in the outer side slot is regarded as an outer side permanent magnet, the permanent magnet disposed in the inner side slot is regarded as an inner side permanent magnet, in the circumferential direction of the rotor, the portions of the inner side permanent magnet and the outer side permanent magnet facing each other are magnetized to have different magnetic poles, and a first total magnetic flux of the outer side permanent magnet is determined to be larger than or equal to a second total magnetic flux of the inner side permanent magnet when the center-line of the outer side slot and the inner side slot in a circumferential direction of the rotor is adjacent one or more of the center-lines of the stator magnetic pole portions in the circumferential direction of the stator, and when the armature coils winding around the stator magnetic pole portions are not electrically fed.

8. The synchronous reluctance motor according to claim 7, wherein the first total magnetic flux and the second total magnetic flux are determined by changing shapes and sizes of the outer side permanent magnets and the inner side permanent magnets depending on locations thereof in the radial direction of the rotor.

9. The synchronous reluctance motor according to claim 7, wherein the outer side permanent magnets and the inner side permanent magnets are constructed of a plurality of permanent magnets uniformly formed in size and shape, the first total magnetic flux and second total magnetic flux being determined by changing the number of unit permanent magnets disposed in the outer side slot and the inner side slot.

10. The synchronous reluctance motor according to claim 7, wherein each of the outer side slot and the inner side slot has a space defined between the permanent magnets disposed in the slots and an inner peripheral surface of the slots in the radial direction of the rotor, the space is filled with non-magnetic materials, and the first total magnetic flux and second total magnetic flux are determined by changing sizes of the space in the radial direction of the rotor.

* * * * *